United States Patent
Hatanaka

(10) Patent No.: US 10,773,554 B2
(45) Date of Patent: Sep. 15, 2020

(54) PNEUMATIC TIRE

(71) Applicant: BRIDGESTONE CORPORATION, Chuo-ku, Tokyo (JP)

(72) Inventor: Shintaro Hatanaka, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 124 days.

(21) Appl. No.: 15/571,135

(22) PCT Filed: Apr. 14, 2016

(86) PCT No.: PCT/JP2016/002031
§ 371 (c)(1),
(2) Date: Nov. 1, 2017

(87) PCT Pub. No.: WO2016/189795
PCT Pub. Date: Dec. 1, 2016

(65) Prior Publication Data
US 2018/0257437 A1    Sep. 13, 2018

(30) Foreign Application Priority Data

May 25, 2015  (JP) .................. 2015-105695

(51) Int. Cl.
*B60C 11/12*    (2006.01)
*B60C 11/04*    (2006.01)
*B60C 11/03*    (2006.01)

(52) U.S. Cl.
CPC .............. *B60C 11/04* (2013.01); *B60C 11/03* (2013.01); *B60C 11/12* (2013.01);
(Continued)

(58) Field of Classification Search
CPC ............. B60C 11/12; B60C 2011/1254; B60C 2011/0386; B60C 11/04; B60C 11/124
See application file for complete search history.

(56) References Cited

U.S. PATENT DOCUMENTS 3,115,919 A * 12/1963 Roberts ................. B60C 11/12
                                                152/209.17
4,266,592 A *  5/1981 Takigawa ............ B60C 11/032
                                                152/209.17
(Continued)

FOREIGN PATENT DOCUMENTS

CN    106457924 A    2/2017
CN    107074036 A    8/2017
(Continued)

OTHER PUBLICATIONS

Apr. 26, 2018, Search Result of Extended European Search Report issued by the European Patent Office in the corresponding European Patent Application No. 16799511.7.
(Continued)

*Primary Examiner* — Timothy Kennedy
*Assistant Examiner* — Alexander A Wang
(74) *Attorney, Agent, or Firm* — Kenja IP Law PC

(57) ABSTRACT

The pneumatic tire includes, on a tread surface, at least two circumferential main grooves and at least one rib-like land portion defined by two of the circumferential main grooves. The rib-like land portion includes neither grooves nor sipes that extend to include a widthwise center line of the rib-like land portion. The rib-like land portion includes a one-end-open sipe and a both-end-closed sipe. The one-end-open sipe has a widthwise sipe portion and a circumferential sipe portion, the widthwise sipe portion extending in tire width direction from one end of the one-end-open sipe and being terminated within the rib-like land portion, and the circumferential sipe portion being located closer to the widthwise center line than the both-end-closed sipe, extending in tire circumferential direction from the widthwise sipe portion, and being terminated at another end of the one-end-open sipe.

12 Claims, 11 Drawing Sheets

(52) U.S. Cl.
CPC ......... *B60C 11/1259* (2013.01); *B60C 11/124* (2013.01); *B60C 2011/0341* (2013.01); *B60C 2011/0355* (2013.01); *B60C 2011/0386* (2013.01); *B60C 2011/0388* (2013.01); *B60C 2011/1227* (2013.01); *B60C 2011/1254* (2013.01)

(56) References Cited

U.S. PATENT DOCUMENTS

| | | | |
|---|---|---|---|
| 6,196,288 B1* | 3/2001 | Radulescu | B60C 11/0309 152/209.17 |
| 2013/0092304 A1* | 4/2013 | Murata | B60C 11/0306 152/209.18 |
| 2013/0167997 A1* | 7/2013 | Hayashi | B60C 11/04 152/209.18 |
| 2017/0197466 A1 | 7/2017 | Hatanaka et al. | |
| 2017/0305199 A1 | 10/2017 | Hatanaka et al. | |

FOREIGN PATENT DOCUMENTS

| | | |
|---|---|---|
| EP | 3205515 A1 | 8/2017 |
| JP | S61200008 A | 9/1986 |
| JP | H111147407 A | 6/1999 |
| JP | 2003127618 A | 5/2003 |
| JP | 2005007958 A | 1/2005 |
| JP | 2008273301 A | 11/2008 |
| JP | 2011025786 A | 2/2011 |
| JP | 2011105074 A | 6/2011 |
| JP | 2014162295 A | 9/2014 |
| JP | 5810204 B1 | 11/2015 |
| WO | 2015182153 A1 | 12/2015 |

OTHER PUBLICATIONS

Nov. 29, 2018, search result of Office Action issued by the State Intellectual Property Office in the corresponding Chinese Patent Application No. 201680030005.6.

* cited by examiner

PNEUMATIC TIRE

TECHNICAL FIELD

The disclosure relates to a pneumatic tire.

BACKGROUND

To improve various performances of an existing pneumatic tire, it has been proposed to improve rigidity (circumferential rigidity) in the tire circumferential direction of land portions in a tread portion that are defined, for example, by circumferential main grooves and widthwise grooves provided in the tread portion (refer, for example, to Patent Literature 1).

CITATION LIST

Patent Literature

PTL1: JPH11147407A

SUMMARY

Technical Problem

In the above regard, although improving tire circumferential rigidity of the land portions in the tread portion leads to improvement in braking performance, driving performance, wear resistance performance, or the like, such a tire is further required to improve its wet performance.

Accordingly, the present disclosure is to provide a pneumatic tire that improves tire circumferential rigidity of the land portions in the tread portion and that also improves wet performance.

Solution to Problem

One of aspects of the present disclosure resides in a pneumatic tire including, on a tread surface, at least two circumferential main grooves extending continuously in a tire circumferential direction and at least one rib-like land portion defined by two adjacent circumferential main grooves of the at least two circumferential main grooves. The rib-like land portion includes neither grooves nor sipes that extend to include a widthwise center line of the rib-like land portion. The rib-like land portion includes a one-end-open sipe and a both-end-closed sipe, the one-end-open sipe having one end open to one of the circumferential main grooves and another end closed within the rib-like land portion, and the both-end-closed sipe having both ends closed within the rib-like land portion. The one-end-open sipe has a circumferential sipe portion and a widthwise sipe portion, the circumferential sipe portion being located closer to the widthwise center line of the rib-like land portion than the both-end-closed sipe, and the widthwise sipe portion extending from the circumferential sipe portion and being open to the one of the circumferential main grooves.

According to the presently disclosed pneumatic tire, tire circumferential rigidity of the land portion in the tread portion is improved, and wet performance is also improved.

In the present disclosure, "sipe" refers to that with an opening width toward the tread surface of 2 mm or less in a state where the tire is assembled to a rim, filled with an internal pressure of 30 kPa, which is a degree of pressure that maintains the shape of the tire, and no load is applied thereon (hereinafter, the "state where the tire is assembled to a rim, filled with an internal pressure of 30 kPa, which is a degree of pressure that maintains the shape of the tire, and no load is applied thereon" may be called "low-pressure no-load state"). "Groove" refers to that with an opening width toward the tread surface of more than 2 mm in the low-pressure no-load state.

Hereinafter, unless noted otherwise, dimensions, etc. of elements of the tread surface are measured on a developed view of the tread surface in the low-pressure no-load state.

Herein, "rim" mentioned above refers to a standard rim (which is called a measuring rim in European Tire and Rim Technical Organization [ETRTO] STANDARDS MANUAL and a design rim in the TIRE and RIM ASSOCIATION INC. [TRA] YEAR BOOK) in applicable size specified or that will be specified in the future in industrial standards valid in respective regions where tires are manufactured and used. Examples of such industrial standards include Japan Automobile Tire Manufacturers Association (JATMA) YEAR BOOK in Japan, ETRTO STANDARDS MANUAL in Europe, and the TRA YEAR BOOK in the United States (in other words, the aforementioned "rim" includes any size currently included and any size which may be included in the future in the above industrial standards, wherein examples of "size that will be specified in the future" may include sizes described as "FUTURE DEVELOPMENTS" in ETRTO STANDARDS MANUAL 2013). On the other hand, in the case of a size not specified in the aforementioned industrial standards, "rim" refers to a rim whose width corresponds to the bead width of the tire.

In the present disclosure, "rib-like land portion" refers to a land portion not provided with a groove that has both ends open to the circumferential main grooves, defining the land portion, to cross the land portion.

In a preferred embodiment of the presently disclosed pneumatic tire, the both-end-closed sipe includes a small hole that has a circular shape when viewed on the tread surface. With the above configuration, tire circumferential rigidity of the land portion in the tread portion is further improved, and wet performance is also improved.

In the present disclosure, "small hole" refers to a hole that extends from the tread and that is open to the tread surface.

In another preferred embodiment of the presently disclosed pneumatic tire, depth of the one-end-open sipe, depth of the both-end-closed sipe, and depth of the circumferential main grooves have the following relation: depth of the circumferential main grooves≥depth of the both-end-closed sipe>depth of the one-end-open sipe. With the above configuration, the effect of improving wet performance is maintained even in later wear stage of the tire.

In the present disclosure, "depth" of each sipe or circumferential main groove refers to an average depth of the sipe measured along an extending direction of the sipe or a depth of the circumferential main groove measured at a portion of the circumferential main groove in which the one-end-open sipe is open.

Advantageous Effect

The present disclosure provides a pneumatic tire that improves the tire circumferential rigidity of the land portion in the tread portion and that also improves wet performance.

DETAILED DESCRIPTION

Hereinafter, with reference to the drawings, a pneumatic tire (hereinafter, may be simply called "tire") according to Embodiment 1 of the present disclosure will be described in detail by illustration. The following descriptions and drawings are examples illustrating the tire of the present disclosure, and the present disclosure is not intended to be limited in any way by the descriptions and illustrated modes.

Figure 1:
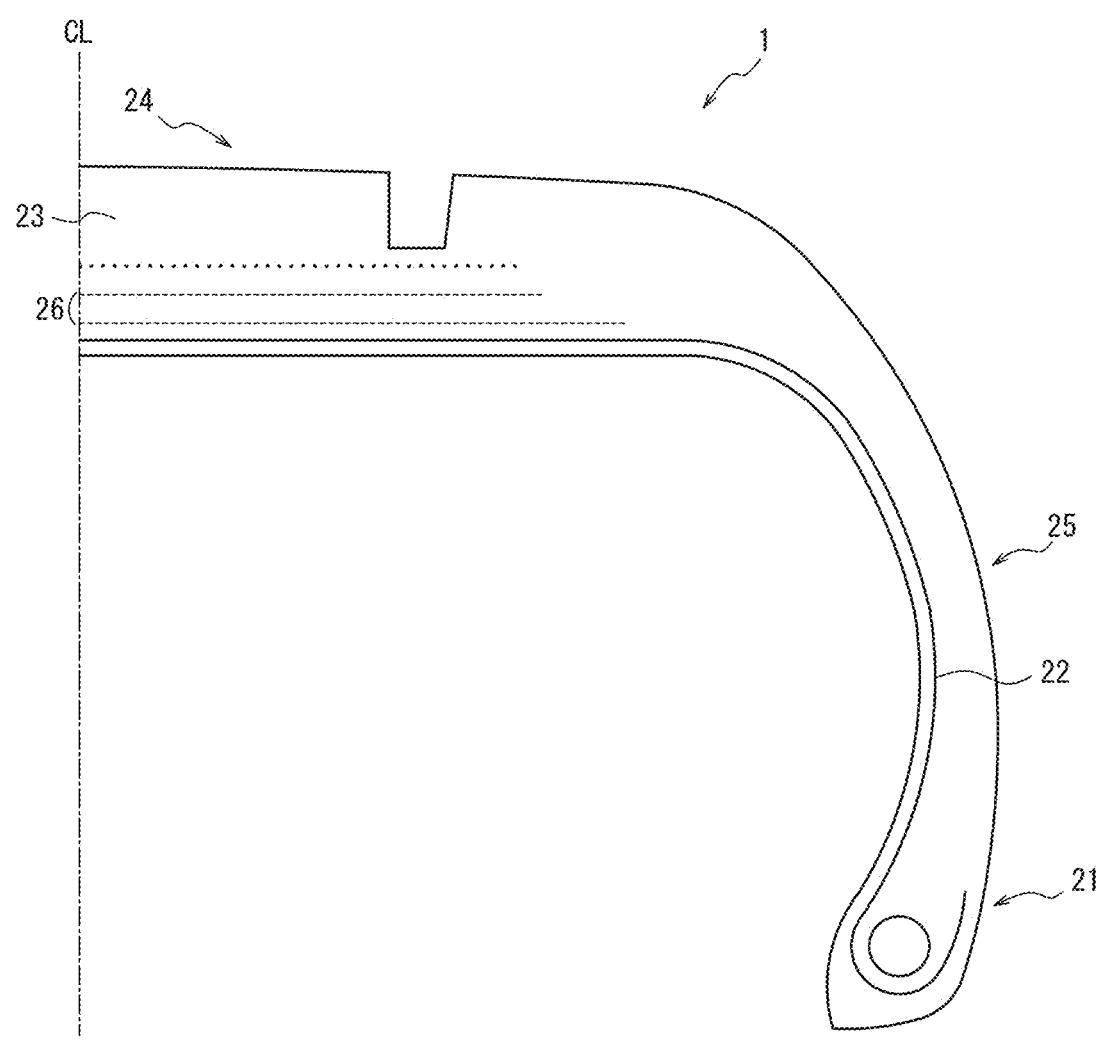
FIG. 1 is a schematic sectional view in tire width direction of a half portion of a pneumatic tire according to Embodiment 1 of the present disclosure.

As illustrated in FIG. 1, a pneumatic tire 1 of the present disclosure may include at least a carcass 22, which is composed of plies of radially arranged cords toroidally extending between a pair of bead portions 21, and a tread rubber 23, which is disposed on a tire radial outer side of the carcass 22.

More concretely, the tire 1 is provided with a tread portion 24, a pair of sidewall portions 25, which continuously extends in the lateral face of the tread portion 24 toward the tire radial inner side, bead portions 21, which continuously extend from each sidewall portion 25 toward the inner ends in the tire radial direction, and a carcass 22, which consists of one or more carcass plies toroidally extending from one bead portion 21 to the other bead portion 21 to reinforce each of the above portions. In the bead portions 21, bead cores are embedded. Furthermore, as reinforcement members for the above bead portions 21, rubber chafers are provided on the outer side surfaces of the bead portions 21, and a belt 26, which consists of one or more belt layers, is provided on the crown portion of the carcass 22. The tread rubber 23 is disposed on the tire radial outer side of the crown portion of the carcass 22.

Figure 2:
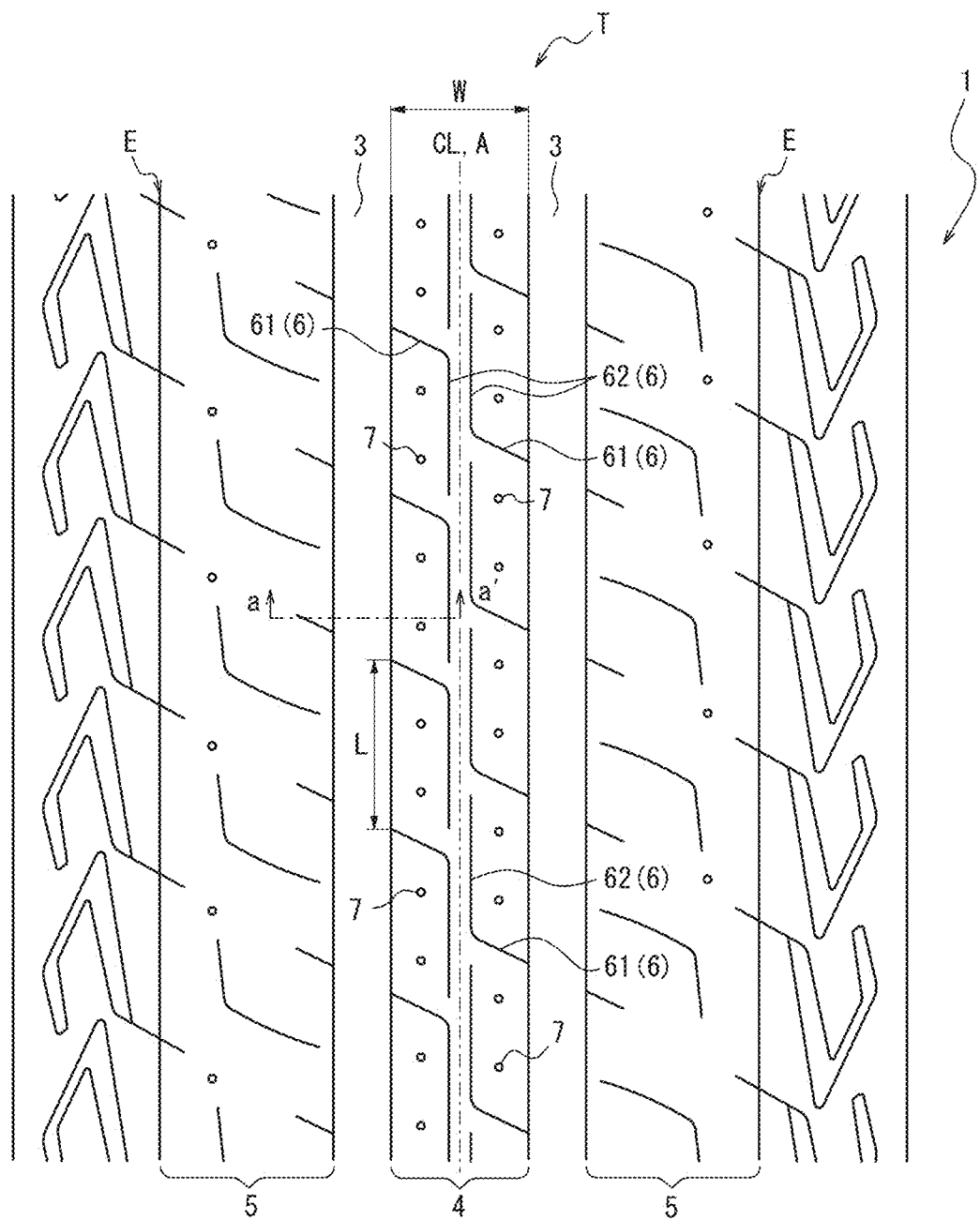
FIG. 2 is a development view of a tread pattern of a pneumatic tire illustrated in FIG. 1.
Figure 6:
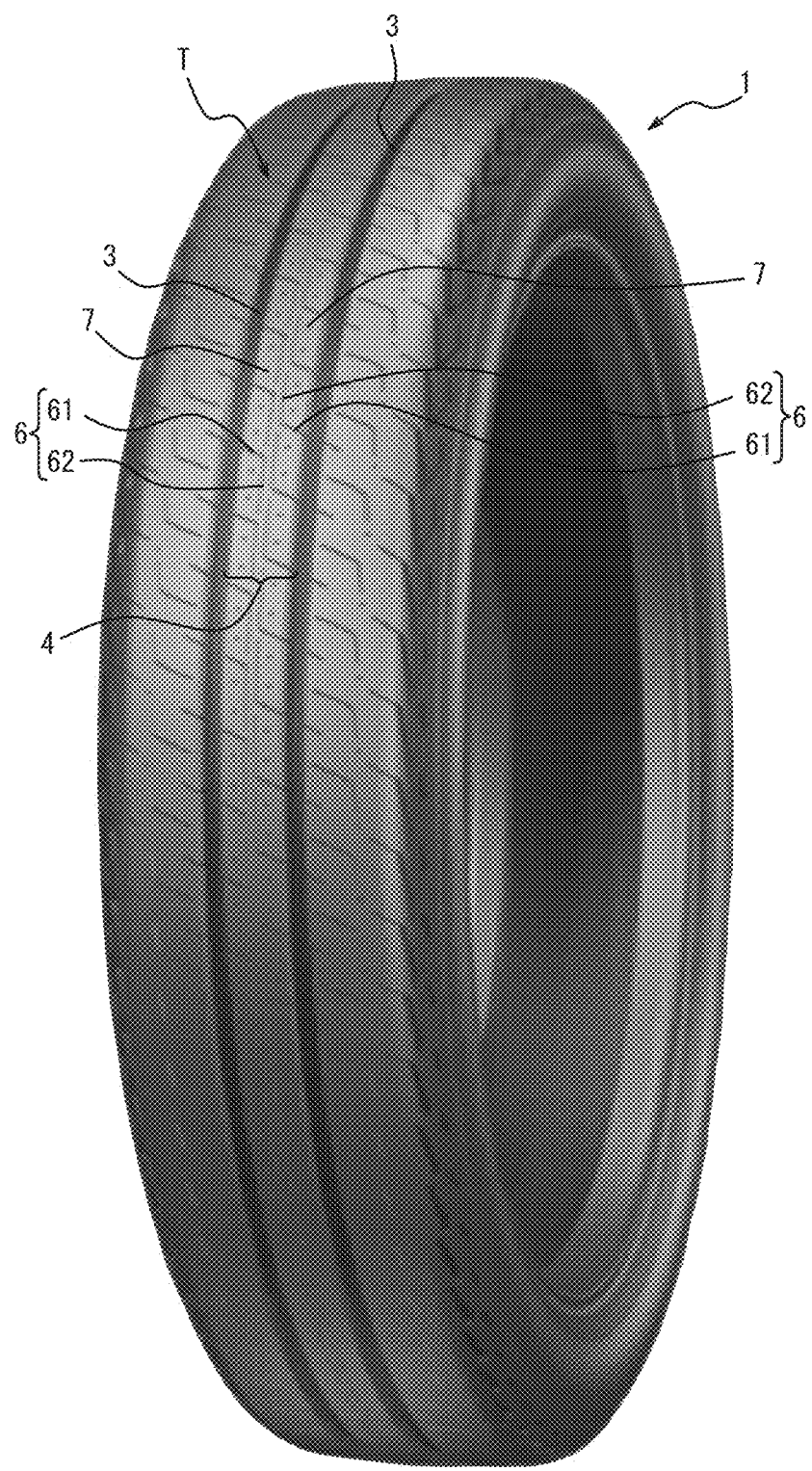
FIG. 6 is a perspective view of a pneumatic tire illustrated in FIG. 1.

In the present embodiment illustrated in FIGS. 2 and 6, at least two circumferential main grooves 3, which continuously extend in the tire circumferential direction, are disposed on a tread surface T. Although in the illustrated example the two circumferential main grooves 3, continuously extending linearly in the developed view along the tire circumferential direction, are disposed, three or more circumferential main grooves 3 may also be disposed. Furthermore, although in FIG. 2 the circumferential grooves 3 is illustrated as extending linearly along the tire circumferential direction, the circumferential grooves 3 only need to continuously extend in the tire circumferential direction and may extend in a zigzag shape, a wavy shape, etc.

In the present embodiment, there is provided at least one rib-like land portion 4, which is defined by two adjacent circumferential main grooves 3. In the illustrated example, a single rib-like land portion 4 is located at the center of the tread surface T. There are also provided shoulder land portions 5, which are located on shoulder sides of the tread surface T. The shoulder land portions 5 are defined by two circumferential main grooves 3 that are located on the tire widthwise outermost sides of the circumferential main grooves 3 and by the tread ground contact edges E.

Herein, the rib-like land portion 4 in the present embodiment is continuous in the tire circumferential direction, and more concretely, does not include grooves that have both ends open to the circumferential main grooves 3, which defines the land portion 4, to cross the rib-like land portion 4. Furthermore, the rib-like land portion 4 include neither grooves nor sipes that extend to include a widthwise center line A of the rib-like land portion 4. In detail, neither grooves nor sipes are located on the widthwise center line A of the rib-like land portion 4, and the land portion's midsection located on the widthwise center line A of the rib-like land portion 4 is continuous in the tire circumferential direction.

In the rib-like land portion 4, or, particularly in the present embodiment, in each of land portion's halves located on both the widthwise sides of the widthwise center line A of the rib-like land portion 4, there are arranged one-end-open sipes 6, which each have one end open to a circumferential main groove 3 and another end closed within the land portion 4, and both-end-closed sipes 7, which each have both ends closed within the rib-like land portion 4. Each one-end-open sipe 6 has a circumferential sipe portion 62, which is located closer to the widthwise center line A of the rib-like land portion 4 than the both-end-closed sipes 7, and a widthwise sipe portion 61, which extends from the circumferential sipe portion 62 and is open to the circumferential main groove 3.

In the present embodiment, the one-end-open sipes 6 and the both-end-closed sipes 7 are disposed in plurality in the tire circumferential direction. In detail, in each of the land portion's halves located on both the widthwise sides of the widthwise center line A of the rib-like land portion 4, the one-end-open sipes 6 are arranged side by side in the tire circumferential direction with a later-described pitch length L (hereinafter, pitch length of the one-end-open sipes 6 is called "pitch length L"), and the both-end-closed sipes 7 are arranged side by side in the tire circumferential direction, with one or more both-end-closed sipes 7 being arranged for a single one-end-open sipe 6 as a set of sipes.

The pitch length L may be unchanged and constant through the tire circumferential direction or may vary and be inconstant in the tire circumferential direction.

The widthwise sipe portion 61 of a one-end-open sipe 6 has one end serving as one end of the one-end-open sipe 6 and another end located closer to the one end of the widthwise sipe portion 61 than to the widthwise center line A of the rib-like land portion 4. Furthermore, the widthwise sipe portion 61 extends at an angle of preferably 30° or less with respect to the tire width direction in a portion of the rib-like land portion 4 that is located closer to the one end than to the widthwise center line A of the rib-like land portion 4 in the tire width direction.

The circumferential sipe portion 62 of the one-end-open sipe 6 has one end coupled to the other end of the widthwise sipe portion 61 and another end located in a portion of the rib-like land portion 4 that is located closer to the one end of the one-end-open sipe 6 than to the widthwise center line A of the rib-like land portion 4 in the tire width direction. Furthermore, the circumferential sipe portion 62 extends at an angle of preferably 30° or less, more preferably 20° or less (in this example, 0°), with respect to the tire circumferential direction in a portion of the rib-like land portion 4 that is located closer to the one end of the widthwise sipe portion 61 than to the widthwise center line A of the rib-like land portion 4.

A both-end-closed sipe 7 is not open to a circumferential main groove 3 directly or indirectly (e.g., by being coupled to the circumferential main groove 3 via another sipe or groove). Furthermore, the both-end-closed sipe 7 is located closer to the circumferential main groove 3 to which the one-end-open sipe 6 is open than to the circumferential sipe portion 62 of the one-end-open sipe 6 (i.e., the circumferential sipe portion 62 of the one-end-open sipe 6 is located closer to the widthwise center line A than the both-end-closed sipe 7).

In the present embodiment, the both-end-closed sipes 7 are arranged as sipes that have a circular shape, that is to say, circular small holes, when viewed on the tread surface.

Additionally, in the present embodiment, a set of a one-end-open sipe 6 and both-end-closed sipes 7 arranged in land portion's one half located on one widthwise side of the widthwise center line A of the rib-like land portion 4 and a set of a one-end-open sipe 6 and both-end-closed sipes 7 arranged in the land portion's other half located on the other widthwise side of the widthwise center line A of the rib-like land portion 4 are not aligned with each other in the tire circumferential direction and are in point symmetry about one point on the widthwise center line A of the rib-like land portion 4. However, these sets of a one-end-open sipe 6 and both-end-closed sipes 7 may be arranged in any manner. Furthermore, although the one-end-open sipes 6 and the both-end-closed sipes 7 are arranged in the land portion's halves located on both the widthwise sides of the widthwise center line A of the rib-like land portion 4, the one-end-open sipes 6 and the both-end-closed sipes 7 may be arranged only on one side, and any sipes may be arranged on the other side. Moreover, although in the present embodiment the widthwise sipe portion 61 and the circumferential sipe portion 62 of a one-end-open sipe 6 have a linear shape when viewed on the tread surface, the widthwise sipe portion 61 and the circumferential sipe portion 62 may have any shape such as a curved shape.

Here, a description is given below of effects of the pneumatic tire 1 in the present embodiment.

Since the tire 1 in the present embodiment includes at least one land portion formed on the tread surface T as the rib-like land portion 4, which is defined by two adjacent circumferential main grooves 3 and which is continuous in the tire circumferential direction, circumferential rigidity (circumferential shearing rigidity) of the land portion 4 is increased. Accordingly, performance such as wear resistance, braking performance, driving performance, and wet performance is improved.

Herein, when the tire is in contact with the ground, the rib-like land portion is squashed under load, and the tread rubber of the rib-like land portion expands (undergoes crushing) into the circumferential main grooves, causing stress concentration on widthwise end sides of the rib-like land portion, thus placing the widthwise end sides under significant shearing stress in the width direction.

Assume that circumferential rigidity of the rib-like land portion is uniform in the width direction. In this case, during, for example, breaking of the tire, although shearing stress in the tire circumferential direction is distributed uniformly over the tire width direction, shearing stress in the tire width direction is relatively higher on the widthwise end sides of the rib-like land portion than on the middle side thereof, and the widthwise end sides of the rib-like land portion are subjected to greater force resulting from sharing force in the tire width direction and shearing force in the tire circumferential compared with the middle side of the rib-like land portion. That is to say, resultant force of shearing stress is more likely to exceed the maximum frictional force on the widthwise end sides of the rib-like land portion than on the middle side of the rib-like land portion. This increases the risk of slippage starting from the widthwise end sides of the rib-like land portion, for example, on a road surface in a wet state (i.e., the slip limit of the rib-like land portion is not considered high).

In view of the above, the tire 1 in the present embodiment includes neither grooves nor sipes that extend to include the widthwise center line A of the rib-like land portion 4 but includes the one-end-open sipes 6 and the both-end-closed sipes 7 on the widthwise outer sides of the widthwise midsection of the rib-like land portion 4. Consequently, rigidity of the rib-like land portion 4 is relatively increased in the middle of the rib-like land portion 4 in the width direction. Accordingly, shearing stress in the tire circumferential direction during, for example, braking of the tire 1 becomes relatively lower on the widthwise end sides of the rib-like land portion 4 than on the widthwise middle side of the rib-like land portion 4 of the rib-like land portion 4. Besides, since shearing stress in the tire width direction is relatively higher on the widthwise end sides of the rib-like land portion 4 than on the middle side of the rib-like land portion 4 due to the aforementioned crushing, resultant force of shearing stress in the tire width direction and shearing stress in the tire circumferential direction is almost uniform through the tire width direction of the rib-like land portion 4. For the above reason, resultant force of shearing stress is unlikely to exceed the maximum frictional force in the width direction of the rib-like land portion 4. This prevents slippage starting from the widthwise end sides of the rib-like land portion 4 even on a road surface in a wet state or the like and thus, increases the slip limit.

Furthermore, in the rib-like land portion having high circumferential rigidity, an effective ground contacting area tends to decrease when the tire contacts a road surface during wet running due to the facts that a water film between the land portion and the road surface is difficult to fully remove and that the land portion is less likely to follow unevenness in the road surface sufficiently. In view of the above, the tire 1 in the present embodiment, which includes the one-end-open sipes 6 and the both-end-closed sipes 7, improves water film removal performance and road surface follow-up performance while maintaining high rigidity, thereby increasing the effective ground contacting area, which in turn improves wet performance. In detail, the presence of the one-end-open sipes 6 promotes water film removal, and the presence of the one-end-open sipes 6 and the both-end-closed sipes 7 reduces compression rigidity (rigidity in the tire radial direction) and improves road surface follow-up performance. Moreover, compared with cases where all the sipes arranged in the rib-like land portion 4 are formed as one-end-open sipes 6, the presence of the both-end-closed sipes 7 prevents a decrease in shearing rigidity in the width direction of the rib-like land portion 4 and, for example, prevents a reduction in cornering power. Additionally, since no sipes that are open at the both ends to the circumferential main grooves 3 are arranged in the tire 1, circumferential rigidity is maintained without an excessive decrease in circumferential rigidity.

Moreover, since the both-end-closed sipes 7 are arranged closer to the circumferential main grooves 3 than the circumferential sipe portions 62 of the one-end-open sipes 6, the decrease in shearing rigidity in the width direction of the rib-like land portion 4 is further prevented, and for example, the decrease in cornering power is further prevented.

Thus, the presently disclosed tire 1 improves circumferential rigidity of the land portion in the tread portion 24 and improves performance such as wear resistance, braking performance, driving performance, and wet performance, and besides, makes shearing stress uniform through the tire width direction of the rib-like land portion 4, promotes water film removal, and reduces compression rigidity and accordingly, improves road surface follow-up performance and improves wet performance.

Meanwhile, in the present embodiment, from the perspective of preventing the decrease in shearing rigidity in the width direction, the circumferential sipe portion 62 of each one-end-open sipe 6 is preferably located at a distance of 25% or more the land portion width W of the rib-like land portion 4 from a corresponding widthwise end of the rib-like land portion 4.

Each both-end-closed sipe 7 may have any shape, such as a linear or a curved shape having both ends terminated within the land portion, and a cross shape having ends all terminated within the land portion. However, from the perspective of preventing the decrease in shearing rigidity in the width direction, the length of the both-end-closed sipe 7 measured in a direction extending along the tire circumferential direction is preferably less than the length of the circumferential sipe portion 62 of the one-end-open sipe 6 measured in a direction extending along the tire circumferential direction. As illustrated in the present embodiment, the both-end-closed sipe 7 is more preferably a circular smaller hole when viewed on the tread surface.

The both-end-closed sipe 7 is located closer to the circumferential main groove 3 to which the corresponding one-end-open sipe 6 is open than the circumferential sipe portion 62 of the one-end-open sipe 6 and preferably arranged within a tire circumferential range of the rib-like land portion 4 in which the one-end-open sipe 6 is located. When the both-end-closed sipe 7 is arranged outside the tire circumferential range in which the one-end-open sipe 6 is located, although the effect of the both-end-closed sipe 7 to reduce compression rigidity is achieved, a gap is formed between two one-end-open sipes 6 adjacent in the tire circumferential direction, and the one-end-open sipes 6 might not be able to provide a sufficient water film removal effect, and improving wet performance sufficiently becomes difficult.

Herein, in the present embodiment, as described earlier, the plurality of one-end-open sipes 6, disposed side by side in the tire circumferential direction, is arranged at a pitch length L side by side in the tire circumferential direction in the land portion's halves located on both the widthwise sides of the widthwise center line A of the rib-like land portion 4. In the land portion's one halve located with respect to the widthwise center line A of the rib-like land portion 4, a plurality of one-end-open sipes 6 is arranged at a pitch length L (mm), and one pitch length L (mm) and a tire circumferential sipe component total length Ls (mm) of a one-end-open sipe 6 and both-end-closed sipes 7 arranged within one pitch length L (mm) preferably have the following relation:

$L \leq Ls \leq 1.5\ L$.

According to the above configuration, compression rigidity is reduced sufficiently, and cornering power is maintained sufficiently.

Note that "pitch length L" refers to a length from one tire circumferential end of one one-end-open sipe 6 to one tire circumferential end of another one-end-open sipe 6 adjacent to the one one-end-open sipe 6 on a developed view measured along the tire circumferential direction. Furthermore, "tire circumferential sipe component total length Ls of a one-end-open sipe 6 and both-end-closed sipes 7 arranged within one pitch length L (mm)" refers to a length obtained by projecting a one-end-open sipe 6 and both-end-closed sipes 7 arranged within one pitch length L in the tire width direction and measuring the projected sipes along the tire circumferential direction in land portion's one half located with respect to the widthwise center line A of the rib-like land portion 4. Note that, when the projected sipes have an overlapped portion, the overlapped portion is added to the tire circumferential sipe component total length Ls.

From the perspectives of reducing compression rigidity and maintaining cornering power, the length of a one-end-open sipe 6 measured along the tire circumferential direction is preferably the pitch length L, and the length of a both-end-closed sipe 7 measured along the tire circumferential direction is preferably less than half the pitch length L.

By setting the tire circumferential sipe component total length Ls to be equal to or greater than the pitch length L in land portion's one half located with respect to the widthwise center line A as described above, compression rigidity of the rib-like land portion 4 is reduced sufficiently, and by setting the tire circumferential sipe component total length Ls to be 1.5 times or less the pitch length L as described above, cornering power is maintained sufficiently.

Although the above description focuses on land portion's one half located on one widthwise side of the widthwise center line A of the rib-like land portion 4, the same arrangement may be applied to land portion's other half.

Furthermore, as in the present embodiment, in the one-end-open sipes 6, one pitch length L and the land portion width W of the rib-like land portion 4 preferably have the following relation:

$0.5\ W \leq L \leq 1.5\ W$.

According to the above configuration, the decrease in tire circumferential rigidity is prevented, and wet performance is also improved.

In the rib-like land portion 4, the pitch length L at which the one-end-open sipes 6 are arranged is preferably from 0.5% to 3.0%, more preferably from 1.0% to 2.5%, of a tire circumferential length on the widthwise center line A of the rib-like land portion 4. The land portion width W of the rib-like land portion 4 is preferably from 15% to 35%, more preferably from 18% to 22%, of tread width TW.

Herein, "tire circumferential length" mentioned above refers to a length measured in the low-pressure no-load state, "tread width" refers to a length measured between the tread ground contact edges E along the tire width direction in the state where the tire 1 is assembled to the aforementioned rim and filled with an internal pressure defined for each vehicle on which the tire is to be fitted, "tread ground contact edge" refers to the tread widthwise outermost position of the tread surface T, and "tread surface" refers to the outer circumferential surface of the whole tire 1 that comes into contact with the road surface when the tire assembled to the above rim and filled with an internal pressure defined for each vehicle on which the tire is fitted is rolled in the state of being applied with a load of 75% of the maximum load capability. Furthermore, the state where the tire is "filled with an internal pressure defined for each vehicle on which the tire is to be fitted" refers to the state where the tire is filled to reach the air pressure (maximum air pressure) corresponding to the maximum load capability for a single wheel in an applicable size/ply rating described or will be described in the future by JATMA YEAR BOOK (JATMA) or the like. "Maximum load capability" refers to the maximum load capability of a single wheel in an applicable size/ply rating described or will be described in the future by the aforementioned JATMA or the like.

On the other hand, in the case of a size not specified in the aforementioned industrial standards, "tire circumferential length" mentioned above refers to a length measured in the low-pressure no-load state, "tread width" refers to a length measured between the tread ground contact edges E along the tire width direction in the state where the tire 1 is assembled to the aforementioned rim and applied with an internal pressure defined for each vehicle on which the tire is to be fitted, "tread ground contact edge" refers to the tread widthwise outermost position of the tread surface T, and "tread surface" refers the outer circumferential surface of the whole tire 1 that comes into contact with the road surface when the tire assembled to the above rim and filled with an internal pressure defined for each vehicle on which the tire is fitted is rolled in the state of being applied with a load of 75% of the load assumed to be applied to the most loaded tire among those placed on four wheels at the maximum riding capacity. Furthermore, the state where the tire is "filled with an internal pressure defined for each vehicle on which the tire is to be fitted" refers to the state where the tire is filled to reach the air pressure (maximum air pressure) corresponding to the load assumed to be applied to the most loaded tire among those placed on four wheels at the maximum riding capacity.

Additionally, air as used herein may be substituted with an inactive gas such as nitrogen gas.

In the present disclosure, when the both-end-closed sipes 7 are small holes as illustrated in the present embodiment, it is preferable that, in land portion's one half located on one widthwise side of the widthwise center line A of the rib-like land portion 4, at least one small hole is arranged within every pitch length L (mm) and that each small hole has an opening area S (mm$^2$) to the tread surface T within the range of $0.1 \leq S \leq 4$.

In the rib-like land portion 4 in the illustrated example, two small holes are arranged in every portion of the land portion that is surrounded by the widthwise sipe portion 61 and the circumferential sipe portion 62 of one one-end-open sipe 6 and another one-end-open sipe 6 located adjacent to the one one-end-open sipe 6 in the tire circumferential direction.

By arranging, in the land portion's one half, at least one small hole within every pitch length L (mm) and setting the opening area S (mm$^2$) of each small hole to the tread surface T to be within the range of $0.1 \leq S \leq 4$, compression rigidity is further reduced while maintaining circumferential rigidity of the land portion, and accordingly, wet performance is further improved. In detail, an opening area S of each small hole of 0.1 mm$^2$ or more reduces compression rigidity sufficiently. Furthermore, an opening area S of 4 mm$^2$ or less prevents a decrease in land portion area of the rib-like land portion 4, and accordingly, a decrease in effective ground contacting area. This prevents the effect of improving wet performance from being degraded due to the decrease in effective ground contacting area.

Additionally, when a plurality of small holes is arranged within every pitch length L (mm), the opening area S of each small hole refers to an average value of the plurality of small holes.

In the rib-like land portion 4, the number of small holes is not limited to a particular example. However, in land portion's one half of the rib-like land portion 4, the pitch length L (mm) and the number (N) of small holes arranged within every pitch length L (mm) preferably have the relation $0.1 \leq N/L \leq 0.3$. N/L (pieces/mm) of 0.1 or more reduces compression rigidity sufficiently, and N/L (pieces/mm) of 0.3 or less prevents the decrease in area of the rib-like land portion 4 and also prevents a decrease in cornering power.

Herein, the depth of the one-end-open sipes 6 and the depth of the both-end-closed sipes 7 may be from 1.5 mm to 7.0 mm and from 2.0 mm to 9.0 mm, respectively. The depth of the circumferential main grooves 3, which define the rib-like land portion 4, may be from 5.0 mm to 9.0 mm. Furthermore, in the present embodiment, the depth of the one-end-open sipes 6, the depth of the both-end-closed sipes 7, and the depth of the circumferential main grooves 3 preferably have the following relation: depth of the circumferential main grooves 3≥depth of the both-end-closed sipes 7>depth of the one-end-open sipes 6.

Since the both-end-closed sipes 7 are less prone to cause a decrease in circumferential rigidity, the depth of the both-end-closed sipes 7 may be set to be larger than the depth of the one-end-open sipes 6. As a result, even in later wear stage of the tire 1 in which the one-end-open sipes 6 have been worn, the both-end-closed sipes 7 remain to sustain the effect of improving wet performance.

Here, a description is given of a sectional shape along the tire width direction of the rib-like land portion 4.

Figure 3:
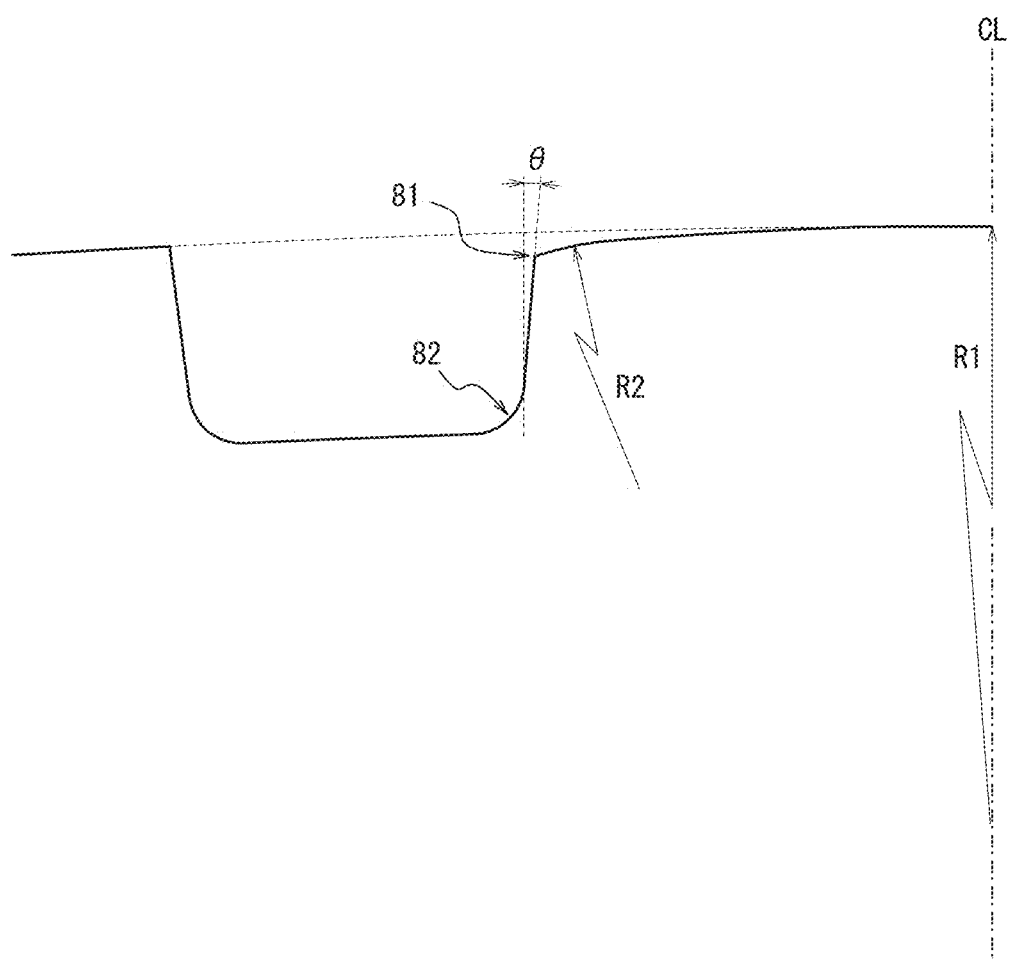
FIG. 3 is a sectional view of a pneumatic tire illustrated in FIG. 2 taken along line a-a'.

FIG. 3 illustrates a half portion of a sectional shape (along the tire width direction) of the rib-like land portion 4 illustrated in FIG. 2 taken along line a-a'.

In the present embodiment, an outer contour (on the side of the tread surface T) of the rib-like land portion 4 may be defined by a plurality of arcs (two arcs in the illustrated example) having different radii of curvature and extending in convex shapes in the tire radial direction. In the plurality of arcs, radii R1 and R2 of curvature may be reduced from the middle side toward the end side in the width direction of the rib-like land portion 4. Furthermore, a connecting portion 81 between the outer contour of the rib-like land portion 4 and a groove wall of the circumferential main groove 3 may have a smoothly curved shape. However, as illustrated in the figure, from the perspective of increasing the effective ground contacting area of the tire 1, the connecting portion 81 is preferably formed as an angular corner.

The groove wall of the circumferential main groove 3, which defines the rib-like land portion 4, is preferably inclined at an angle of 0° to 20° with respect to a direction perpendicular to the tread surface so that the groove width is increased from a groove bottom toward an opening. Furthermore, a coupling portion 82 of the groove bottom and a groove wall in the circumferential main groove 3 is preferably configured in a shape that is, on the tire widthwise section, convex to the tire radial inner side so that the groove bottom is coupled smoothly to the groove wall.

Figure 4:
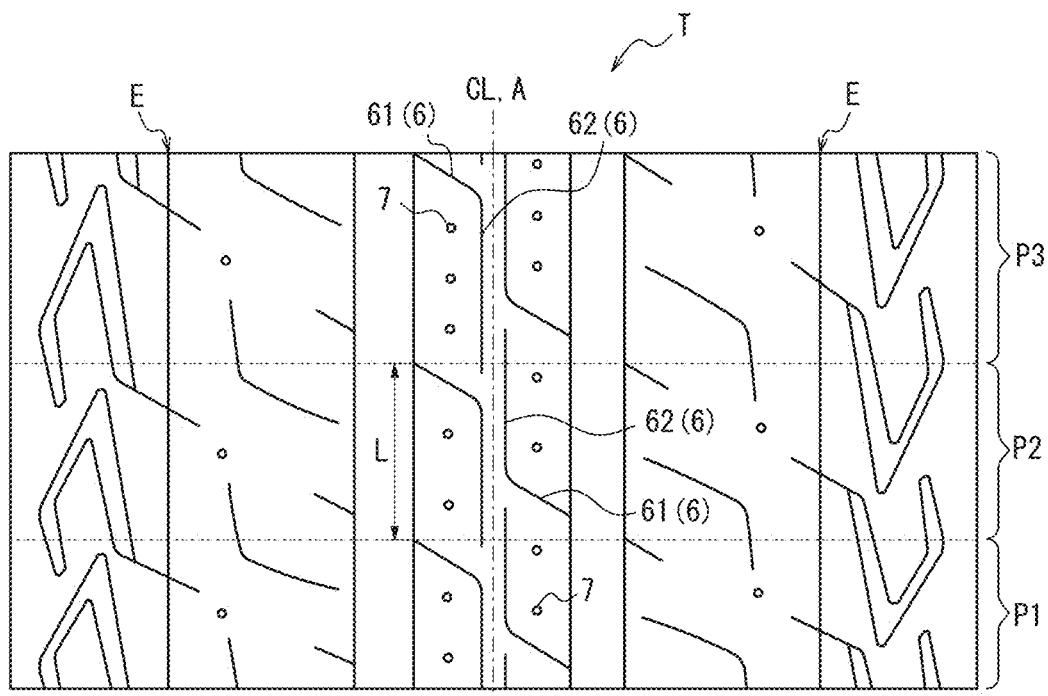
FIG. 4 is a developed view of a tread pattern obtained by altering a pitch at which sipes are arranged in tire circumferential direction in a tread pattern of a pneumatic tire illustrated in FIG. 2.

Meanwhile, in the present embodiment, when the one-end-open sipes 6 are arranged at a pitch length L side by side in the tire circumferential direction, the pitch length L of the one-end-open sipes 6 may be varied around the tire circumference as illustrated in FIG. 4. In detail, a tread pattern illustrated in FIG. 4 includes one-end-open sipes 6, which are arranged at varying pitch lengths while satisfying L≤Ls≤1.5 L in all sub-patterns P1 to P3 described below, L in land portion's one half located on one widthwise side with respect to the widthwise center line A of the rib-like land portion 4. In terms of relative pitch length L, the sub-patterns P1 is largest, followed by the sub-pattern P2 and the sub-pattern P3. In the tread pattern illustrated in FIG. 4, the sub-patterns P1 to P3 are disposed repeatedly in this order. In the sub-patterns P1 and P2, two small holes are arranged within one pitch length L (mm), whereas in the sub-pattern P3, three small holes are arranged within one pitch length L (mm).

Additionally, although the example of FIG. 4 illustrates the three sub-patterns in which pitch length L is varied in the tire circumferential direction, any number of sub-patterns such as two sub-patterns or four or more sub-patterns may be used. Furthermore, although the sub-patterns P1 to P3 are disposed repeatedly in this order, arrangement order of the sub-patterns may be determined randomly. For example, only a single sub-pattern may be arranged several times repeatedly, and another sub-pattern may be subsequently arranged once or several times.

Figure 5:
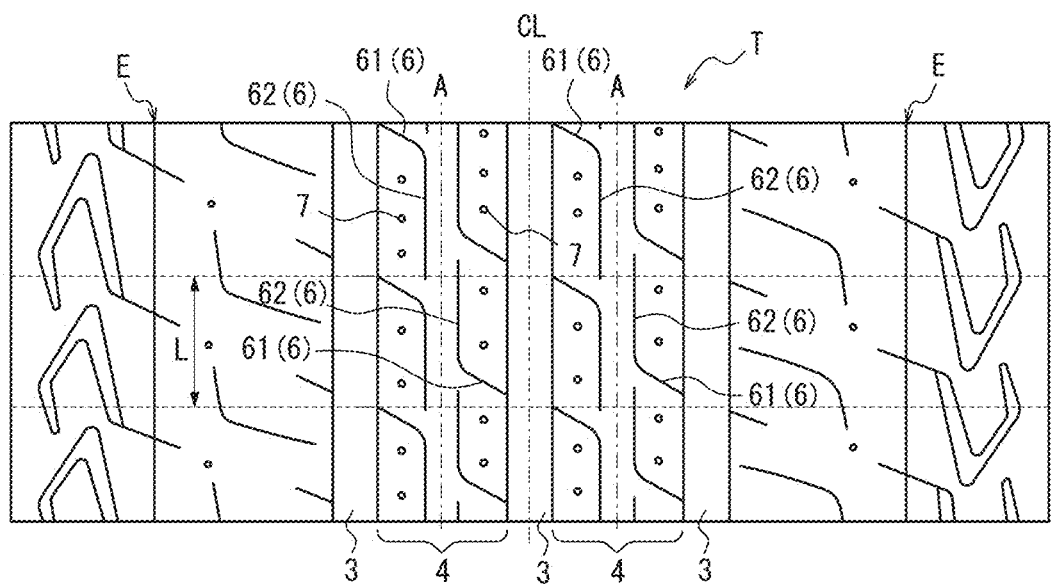
FIG. 5 is a development view of a modification of a tread pattern of a pneumatic tire illustrated in FIG. 4.

Moreover, in the tire 1 illustrated in FIG. 4, two circumferential main grooves 3 and one rib-like land portion 4, which is defined by the two circumferential main grooves 3, are disposed on the tread surface T. However, as illustrated in FIG. 5, three or more circumferential main grooves 3 (three of them in FIG. 5) and all the plurality of land portions defined by the three or more circumferential main grooves 3 as the rib-like land portions 4 may be disposed on the tread surface T to adopt the presently disclosed sipe configuration, or, a part of such plurality of land portions may be disposed as the rib-like land portions 4 to adopt the presently disclosed sipe configuration.

Moreover, although in the shoulder land portions 5 the sipes and small holes are arranged in plurality repeatedly along the tire circumferential direction, various sipes and grooves may be arranged randomly in the shoulder land portions 5.

Herein, in the present embodiment, the tire does not need to have a particular size. However, a pneumatic radial tire for passenger vehicles having a size described below is preferably used as the tire.

In the state where the tire is assembled to a rim, filled with an internal pressure of 250 kPa, and no load is applied thereon, when sectional width SW of the tire is less than 165 (mm), ratio SW/OD of sectional width SW (mm) to outer diameter OD (mm) is 0.26 or less, and when sectional width SW of the tire is 165 (mm) or more, sectional width SW (mm) of the tire and outer diameter OD (mm) preferably satisfy the following relation (hereinafter, may be called Relation [1]):
2.135×SW+282.3≤OD.
(Note that tire size when the above relation holds may also be called narrow-width large-diameter size.) Because the above relation is satisfied, the tire has a narrow-width large-diameter shape, and therefore, the rolling resistance performance of the tire is improved (i.e., rolling resistance is decreased), and the weight of the tire is reduced.

Furthermore, the internal pressure during rolling of the tire is preferably 250 kPa or more, and more preferably from 250 kPa to 350 kPa. The reason is that, although a tire with narrow-width large-diameter size tends to have an increased ground contact length, an internal pressure of 250 kPa or more curbs the increase in ground contact length, reduces the deformation of the tread rubber, and further reduces rolling resistance.

Furthermore, from the perspective of reducing tire rolling resistance and reducing tire weight, it is preferable that, when the internal pressure during rolling of the tire is 250 kPa or more, sectional width SW (mm) and outer diameter OD (mm) of the tire preferably have the following relation (hereinafter, may be also called Relation (2)): $-0.0187 \times SW^2 + 9.15 \times SW - 380 \leq OD$.

Note that "sectional width SW" and "outer diameter OD" of the tire refer to the sectional width and outer diameter defined by JIS D 4202-1994 when the tire is assembled to a rim, filled with an internal pressure of 250 kPa or more, and no load is applied thereon.

When the tire has narrow-width large-diameter size with the aforementioned tire section width SW and outer diameter OD, dynamic storage modulus E' of the tread rubber at 30° C. is preferably from 6.0 MPa to 12.0 MPa. In a narrow-width large-diameter tire, setting the dynamic storage modulus E' of the tread rubber to be within the above specific range improves the friction coefficient μ in a wet condition, and therefore, improves wet performance. Furthermore, adopting the above dynamic storage modulus E' improves the cornering power upon cornering and improves the steering stability. From the same perspective, dynamic storage modulus E' is more preferably from 7.9 MPa to 12.0 MPa, and even more preferably from 8.0 MPa to 11.0 MPa.

Moreover, when the tire is a narrow-width large-diameter tire, loss tangent tan δ of the tread rubber at 60° C. is preferably from 0.05 to 0.15. The reason is that rolling resistance performance is improved.

Dynamic storage modulus E' (MPa) and loss tangent tan δ (i.e., ratio [E"/E'] of dynamic loss elastic modulus [E"] to dynamic storage modulus [E']) are related to vulcanized rubber and are values obtained by applying an initial load of 160 g on a test piece of thickness: 2 mm; width: 5 mm; and length: 20 mm, and carrying out measurement under the conditions of initial strain: 1%; and frequency: 50 Hz. Dynamic storage modulus E' is, unless otherwise specified, the value measured at a temperature of 30° C. (hereinafter, dynamic storage modulus E' at 30° C. may also be simply called "dynamic storage modulus E'") and loss tangent tan δ is, unless otherwise specified, the value measured at a temperature of 60° C. (hereinafter, loss tangent tan δ at 60° C. may also be simply called "loss tangent tan δ").

"Tread rubber" refers to rubber containing no members such as a belt which is optionally included in the tread portion.

The tread rubber may be formed by kneading and vulcanizing, in accordance with a commonly-used method, a rubber composition optionally containing, in addition to a conventionally known rubber component, a conventionally known filler, age resistor, vulcanizing agent, vulcanization accelerator, processing oil, anti-scorch agent, zinc oxide, stearic acid and the like.

Kneading may be performed under any conditions, and using a Banbury mixer, roll kneader, internal mixer and the like, the rotor rotation speed, ram pressure, kneading temperature, and kneading time may be adjusted as appropriate depending on the formulation, the volume charged into the kneading apparatus and the like.

Furthermore, as conditions for vulcanizing the rubber composition, the vulcanizing temperature may be, for example, from 100° C. to 190° C. The vulcanization time may be, for example, from 5 minutes to 80 minutes.

Examples of the rubber component of the tread rubber may include, for example, modified or unmodified synthetic rubber such as styrene-butadiene copolymer rubber (SBR), butadiene rubber (BR), polyisoprene rubber (IR), isobutylene isoprene rubber (IIR), halogenated butyl rubber, styrene-isoprene copolymer rubber (SIR) and chloroprene rubber (CR), and natural rubber (NR).

The method for modifying conjugated diene-based polymers such as SBR and BR is not particularly limited to any method, and a conventionally known method may be used. For example, the method described in WO2008050845 (method of allowing a modifying agent to react with active ends of conjugated diene-based polymer, and performing, in the presence of a titanium-based condensation accelerator, condensation reaction involving the modifying agent) may be used.

Preferable examples of conjugated diene-based polymer may include a copolymer of 1,3-butadiene and styrene.

Preferable examples of the modifying agent may include N,N-bis(trimethylsilyl)aminopropylmethyldimethoxysilane, N,N-bis(trimethylsilyl)aminopropylmethyldiethoxysilane, and 1-trimethylsilyl-2-ethoxy-2-methyl-1-aza-2-silacyclopentane.

Preferable examples of the titanium-based condensation accelerator may include tetrakis (2-ethyl-1,3-hexanediolato) titanium, tetrakis (2-ethylhexoxy) titanium, and titanium di-n-butoxide (bis-2,4-pentanedionate).

The aforementioned examples of the rubber component may be used alone or in combination of two or more.

Examples of the filler may include conventionally known carbon black, silica, calcium carbonate, talc, and clay. The aforementioned examples of the filler may be used alone or in combination of two or more.

When the tire is of narrow-width large-diameter size, the rubber composition forming the tread rubber of the tire preferably contains at least a rubber component and a filler, and the rubber composition preferably contains from 50 parts by mass to 100 parts by mass of the filler with respect to 100 parts mass of the rubber component. The reason is that excellent wear resistance and workability are achieved. From the perspective of wear resistance and workability, the filler is contained more preferably in an amount of 55 parts by mass to 85 parts by mass, and even more preferably in an amount of 75 parts by mass to 85 parts by mass, with respect to 100 parts by mass of the rubber component. Furthermore, it is more preferable that the filler is contained in an amount of 50 parts by mass to 90 parts by mass with respect to 100 parts by mass of diene-based polymer (diene-based rubber).

When the tire is of narrow-width large-diameter size, the filler of the tire preferably contains silica, and the silica is preferably contained in an amount of 25 parts by mass to 100 parts by mass with respect to 100 parts by mass of the rubber component. The reason is that excellent wet performance is achieved. From the perspective of wet performance, the silica is contained more preferably in an amount of 50 parts by mass to 75 parts by mass, and even more preferably in an amount of 60 parts by mass to 75 parts by mass, with respect to 100 parts by mass of the rubber component.

When using the silica as the filler, the silica may be processed using a silane coupling agent.

Meanwhile, to set E' to be 6.0 MPa to 12.0 MPa as described above, the composition may be altered as appropriate to obtain, for example, the content of modified S-SBR within the range of 20 phr to 70 phr in 100 phr of diene-based polymer, and the content of silica within the range of 30 phr to 80 phr in 50 phr to 80 phr of the filler.

Furthermore, to set tan δ to be 0.05 to 0.15 as described above, the composition may be altered as appropriate to obtain, for example, the content of NR within the range of 0 phr to 20 phr and the content of modified S-SBR within the range of 20 phr to 70 phr in 100 phr of diene-based polymer, and the content of silica within the range of 30 phr to 80 phr in 50 phr to 80 phr of the filler.

The unit "phr" refers to the content (parts by mass) of each component with respect to 100 parts by mass of the rubber component.

When the tire is of narrow-width large-diameter size, the tire may be a pneumatic radial tire for passenger vehicles with tire size 105/50R16, 115/50R17, 125/55R20, 125/60R18, 125/65R19, 135/45R21, 135/55R20, 135/60R17, 135/60R18, 135/60R19, 135/65R19, 145/45R21, 145/55R20, 145/60R16, 145/60R17, 145/60R18, 145/60R19, 145/65R19, 155/45R18, 155/45R21, 155/55R18, 155/55R19, 155/55R21, 155/60R17, 155/65R13, 155/65R18, 155/70R17, 155/70R19, 165/45R22, 165/55R16, 165/55R18, 165/55R19, 165/55R20, 165/55R21, 165/60R19, 165/65R19, 165/70R18, 175/45R23, 175/55R18, 175/55R19, 175/55R20, 175/55R22, 175/60R18, 175/65R15, 185/45R22, 185/50R16, 185/50R20, 185/55R19, 185/55R20, 185/60R17, 185/60R19, 185/60R20, 195/50R20, 195/55R20, 195/60R19, 195/65R17, 205/50R21, 205/55R16, 205/55R20, 205/60R16, 205/60R18, 215/50R21, 215/60R17, 225/65R17, or the like.

Herein, when the tire is of narrow-width large-diameter size, it is preferable to reduce the amount of grooves in the tread from the perspective of achieving both wet performance and other performance. For example, groove volume ratio (groove volume V2/tread rubber volume V1) is preferably 20% or less, and negative ratio (the ratio of the groove area to the tread surface area) is preferably 20% or less. Those values are smaller than standard values in a pneumatic radial tire for passenger vehicles of a conventional size.

Figure 7A:
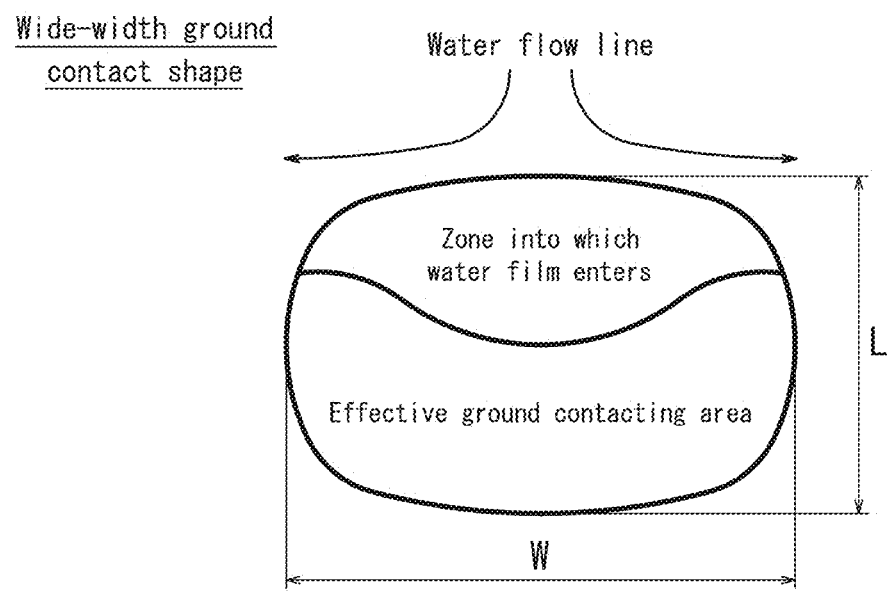
FIG. 7A illustrates wet performance of a wide-width radial tire.
Figure 7B:
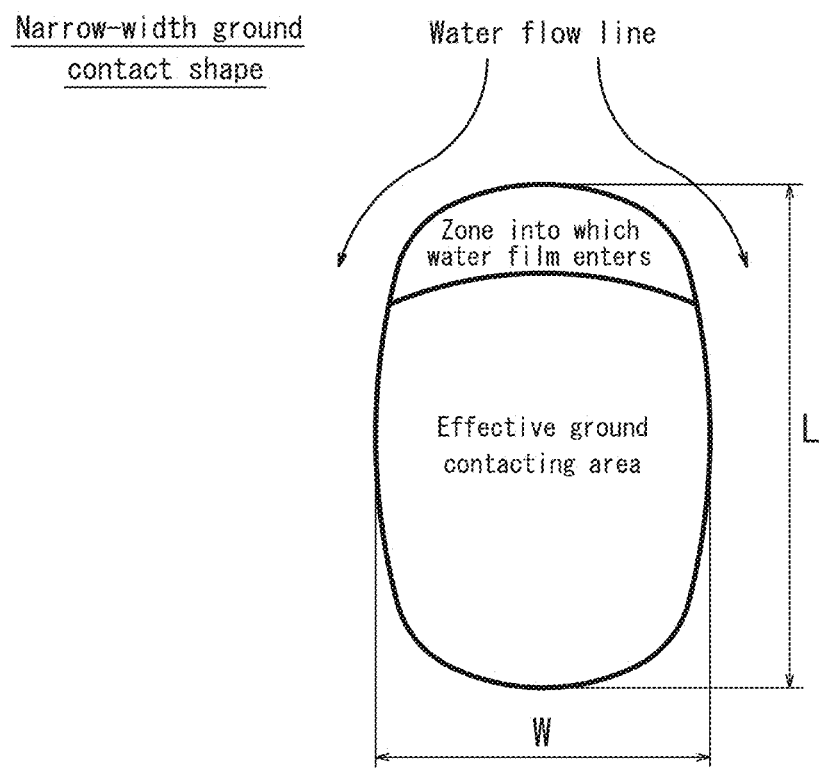
FIG. 7B illustrates wet performance of a narrow-width radial tire.

A general idea is that the groove amount is to be increased to improve wet performance. However, in a pneumatic radial tire for passenger vehicles of a narrow-width large-diameter size that satisfies the above relations (1) and/or (2), contact surface width W is reduced, and therefore, as illustrated in FIG. 7B by comparison with FIG. 7A, water is easily drained in the tire width direction. This means that the groove amount may be reduced without impairing wet performance; rather, the land portion rigidity is improved, which leads to improvement of other performance such as cornering power.

Groove volume ratio is defined as the ratio V2/V1, in which V1 represents the volume of the tread rubber located on the tire widthwise inner side than the both ends in the width direction of a maximum width belt layer having the maximum width in the tire width direction of the belt layers, while being located on the tire radial outer side than a reinforcing member (belt layer and belt reinforcement layer) on the tire radial outermost side at the tire widthwise center position, and V2 represents the total volume of grooves formed in the tread surface.

Herein, when the tire is of narrow-width large-diameter size and the mounting direction of the tire with respect to a vehicle (vehicle-mounted direction) is designated, there may be a difference in negative ratio between tire's widthwise one half located on the inside in the vehicle-mounted direction and tire's widthwise other half located on the outside in the vehicle-mounted direction, which are demarcated by the tire equator plane CL.

Among the land portions, the shoulder land portions, which may have a rib shape defined by the circumferential main grooves located on the tire widthwise outermost sides and the tread ground contact ends E, may employ various configurations. For example, in a tire for which the vehicle-mounted direction is designated, widths of the shoulder land portions in the tire width direction may be differentiated between the outside and the inside in the vehicle-mounted direction. In consideration of steering stability, the width in the tire width direction of the shoulder rib-like land portion located on the outside in the vehicle-mounted direction is preferably larger than width in the tire width direction of the shoulder rib-like land portion located on the inside in the vehicle-mounted direction.

Figure 8:
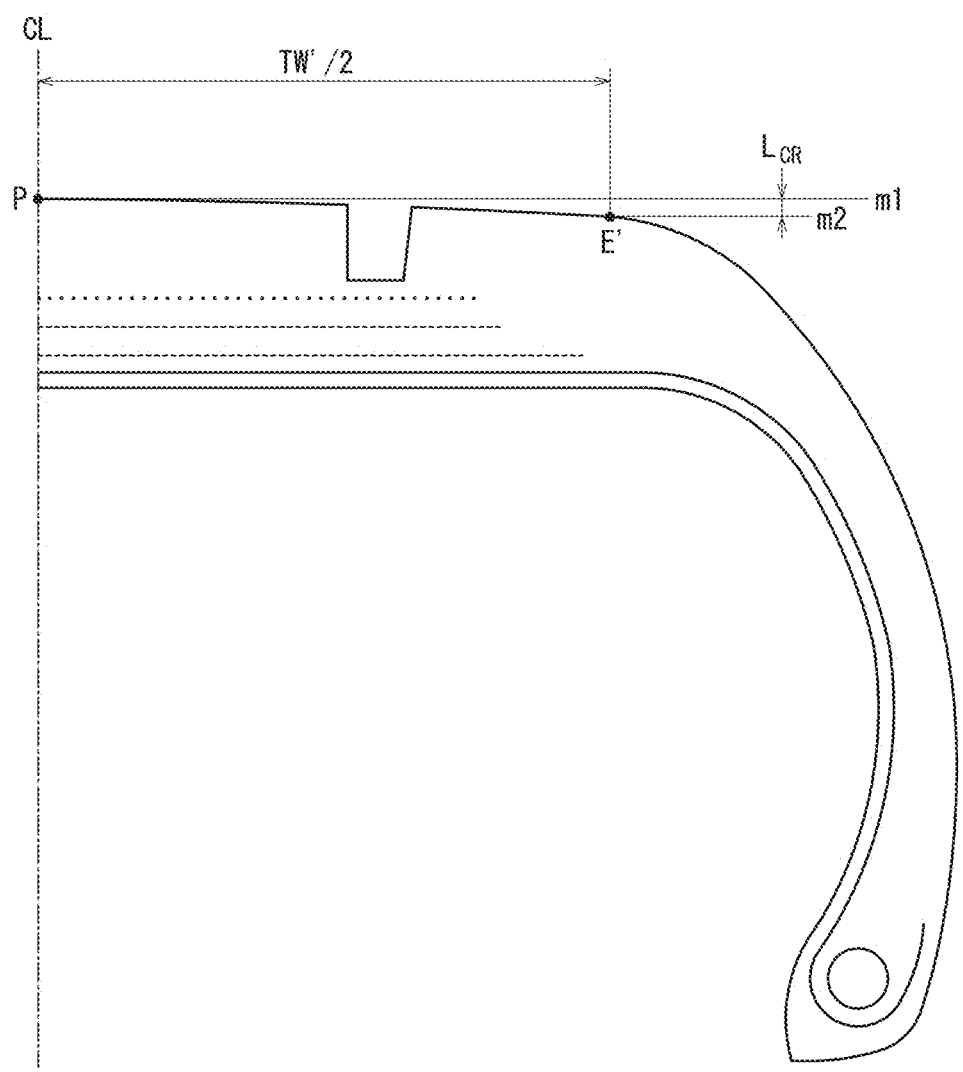
FIG. 8 is a schematic sectional view in tire width direction of a half portion of a pneumatic tire according to Embodiment 2 of the present disclosure.

As illustrated in FIG. 8, in cases of a tire of narrow-width large-diameter size, the distance in the tire radial direction between the straight line m1 and the straight line m2 in a tire widthwise section is defined as a fall height $L_{CR}$, and the tread width of the tire is defined as TW', and ratio $L_{CR}$/TW' is preferably 0.045 or less, the straight line m1 passing through a point P on the tread surface in the tire equator plane CL while being parallel to the tire width direction, the straight line m2 passing through the ground contact end E' while being parallel to the tire width direction. With ratio $L_{CR}$/TW' being within the aforementioned range, the tire has a flattened (planarized) crown portion to increase the contact area, alleviating an input (pressure) from the road surface to reduce the deflection rate in the tire radial direction, and thus, tire durability and wear resistance are improved.

Herein, "ground contact ends E'" mentioned above refer to tire widthwise endpoints on a surface contacting a flat plate when the tire is assembled to a rim, filled with the maximum air pressure defined for each vehicle to which the tire is to be fitted, vertically placed on the flat plate, and applied with weight corresponding to the maximum load defined for each vehicle to which the tire is to be fitted.

In cases of a tire of narrow-width large-diameter size, the tread rubber may be formed of a plurality of different rubber layers laminated in the tire radial direction. The aforementioned plurality of rubber layers may be different from one another in terms of tangent loss, modulus, hardness, glass transition temperature, material, or the like. Furthermore, the ratio of thicknesses in the tire radial direction of the plurality of rubber layers may vary in the tire width direction. Alternatively, only the groove bottoms of the circumferential main grooves or the like may be formed as rubber layers different from the surroundings.

The tread rubber may be composed of a plurality of rubber layers different in the tire width direction. The aforementioned plurality of rubber layers may be different from one another in terms of tangent loss, modulus, hardness, glass transition temperature, material, or the like. Furthermore, the ratio of thicknesses in the tire width direction of the plurality of rubber layers may vary in the tire radial direction. Alternatively, rubber layers in a limited region, such as in the vicinity of the circumferential main grooves alone, in the vicinity of the tread ends E alone, in the shoulder land portions alone, or in the land portion on the center side alone, may be formed as rubber layers different from the surroundings.

A tire of narrow-width large-diameter size preferably has an inclined belt layer formed of a rubberized layer of cords extending to be inclined with respect to the tire circumferential direction, and in this case, only a single inclined belt layer may be disposed. However, in a tire of narrow-width large-diameter size with only a single inclined belt layer, the shape of the contact surface during cornering is easily distorted, and for this reason, it is preferable to dispose two or more inclined belt layers extending in the directions by which the respective cords intersect with each other. A belt configuration in which two belt layers form the inclined belt layers is most preferable.

In a tire of narrow-width large-diameter size, the width in the tire width direction of the maximum width inclined belt layer having the maximum width in the tire width direction is preferably from 90% to 115% of the tread width TW, and particularly preferably from 100% to 105% of the tread width TW.

In a tire of narrow-width large-diameter size, metal cords, for example, steel cords are the most typical examples of belt cords used for the inclined belt layer. However, organic fiber cords may also be used. The steel cords may include steel as a main component and may also contain various micro inclusions such as carbon, manganese, silicon, phosphorous, sulfur, copper, and chromium.

In a tire of narrow-width large-diameter size, monofilament cords and cords obtained by twisting a plurality of filaments may be used as belt cords of the inclined belt layer. Various designs may be adopted for the twist structure which may be different in, for example, sectional structure, twist pitch, twist direction, and a distance between adjacent filaments. Furthermore, cords obtained by twisting filaments of different materials may also be used, and these cords may have various twist structures such as single twist, layer twist, and a multi twist without being limited to any particular sectional structure.

In a tire of narrow-width large-diameter size, the inclination angle of the belt cords of the inclined belt layer is preferably 10° or more with respect to the tire circumferential direction.

In a tire of narrow-width large-diameter size, the inclination angle of the belt cords of the inclined belt layers is preferably high, e.g., 35° or more with respect to the tire circumferential direction, and particularly in the range of 55° to 85° with respect to the tire circumferential direction.

The reason for this is that, by setting the inclination angle to be 35° or more, rigidity with respect to the tire width direction is increased, and steering stability especially upon cornering is improved. Another reason is that shearing deformation of the rubber between layers is reduced, and rolling resistance performance is improved.

A tire of narrow-width large-diameter size may have a circumferential belt formed of one or more circumferential belt layers and located on the tire radial outer side of the inclined belt layer.

When the inclination angles θ1 and θ2 of the belt cords of the inclined belt layer are 35° or more, it is preferable that the circumferential belt has tire circumferential rigidity per unit width of a center region C, which includes the tire equatorial plane CL, higher than tire circumferential rigidity per unit width of other regions.

Figure 9:
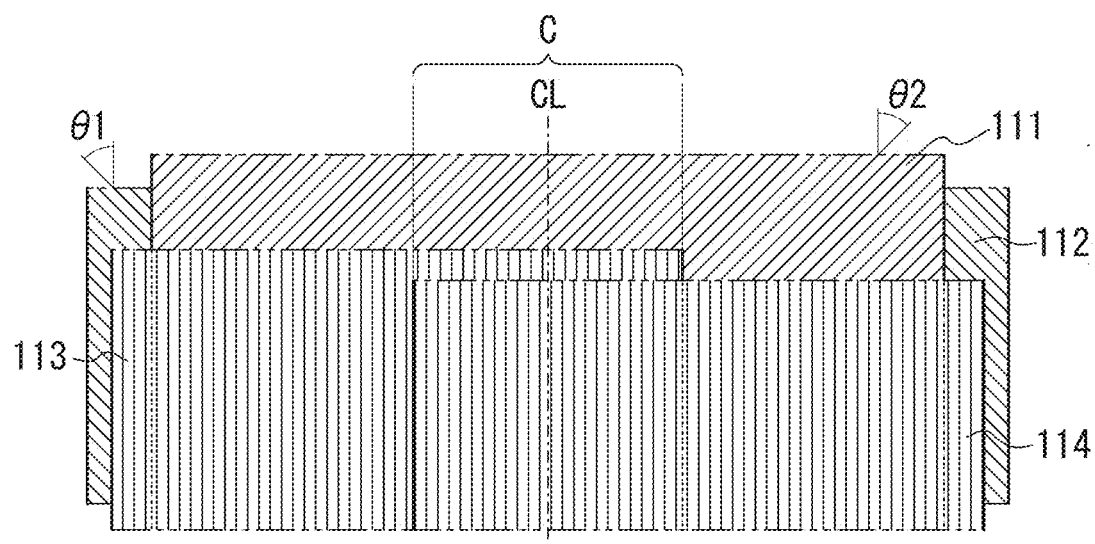
FIG. 9 is a schematic plan view of an example of belt structure.

FIG. 9 schematically illustrates one example of the belt structure, in which circumferential belt layers 113 and 114 are laminated on the outer side of inclined belt layers 111 and 112 in the tire radial direction, and in the center region C, the circumferential belt layers 113 and 114 are overlapped with each other in the tire radial direction.

As illustrated in FIG. 9, for example, by setting the number of circumferential belt layers in the center region C to be greater than that in other regions, tire circumferential rigidity per unit width of the center region C becomes higher than tire circumferential rigidity per unit width of other regions.

In a high frequency region of 400 Hz to 2 kHz, many of the tires having belt cords of the inclined belt layer inclined at an angle of 35° or more with respect to the tire circumferential direction are deformed such that the entire tread surface significantly vibrates in primary, secondary, tertiary, etc. vibration modes in the sectional direction, thus causing large noise emission. To address this, tire circumferential rigidity of the central region of the tread in the tire width direction may be increased locally to make the central region of the tread in the tire width direction less prone to expansion in the tire circumferential direction, thereby preventing expansion of the tread surface in the tire circumferential direction. As a result, noise emission is reduced.

Furthermore, as mentioned above, in a tire in which tire circumferential rigidity of the center region that includes the tire equatorial plane CL has been increased, it is preferable that the tread has a land portion that is continuous in the tire circumferential direction in a region including at least the tire equatorial plane CL of the tread surface. When the circumferential main groove is disposed on the tire equatorial plane CL or in the vicinity thereof, rigidity of the tread in the region might be decreased, and the ground contact length in the land portion defining the circumferential main groove might be shortened drastically. For the above reason, it is preferable to dispose a land portion (rib-like land portion) that is continuous in the tire circumferential direction over a certain region that includes the tire equatorial plane CL from the perspective of improving noise performance without compromising cornering power.

Figure 10:
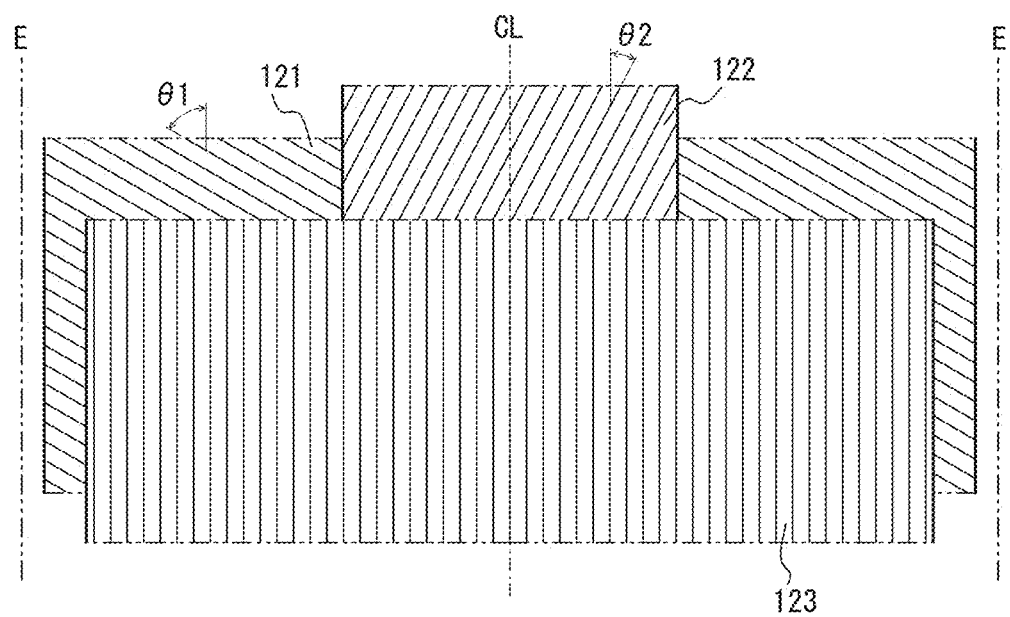
FIG. 10 is a plan view of another example of belt structure.

FIG. 10 schematically illustrates another example of the belt structure, in which a single circumferential belt layer 123 is laminated on the outer side of two inclined belt layers 121 and 122 in the tire radial direction.

In a tire of narrow-width large-diameter size, when the inclination angle of the belt cords of the inclined belt layer is 35° or more as in the example of FIG. 10, it is preferable that the inclined belt layers include at least two inclined belt layers having different widths in the tire width direction and that an inclination angle $\theta 1$ with respect to the tire circumferential direction of the cords forming the inclined belt layer having the maximum width and an inclination angle $\theta 2$ with respect to the tire circumferential direction of the cords forming the inclined belt layer having the minimum width satisfy relations $35°\leq \theta 1 \leq 85°$, $10°\leq \theta 2 \leq 30°$, and $\theta 1 > \theta 2$.

In a high frequency region of 400 Hz to 2 kHz, many of the tires provided with inclined belt layers having belt cords inclined at an angle of 35° or more with respect to the tire circumferential direction are deformed such that the entire tread surface significantly vibrates in primary, secondary, tertiary, etc. vibration modes in the sectional direction, thus causing large noise emission. To address this, tire circumferential rigidity of the central region of the tread in the tire width direction may be increased locally to make the central region of the tread in the tire width direction less prone to expansion in the tire circumferential direction, thereby preventing expansion of the tread surface in the tire circumferential direction. As a result, noise emission is reduced.

Figure 11:
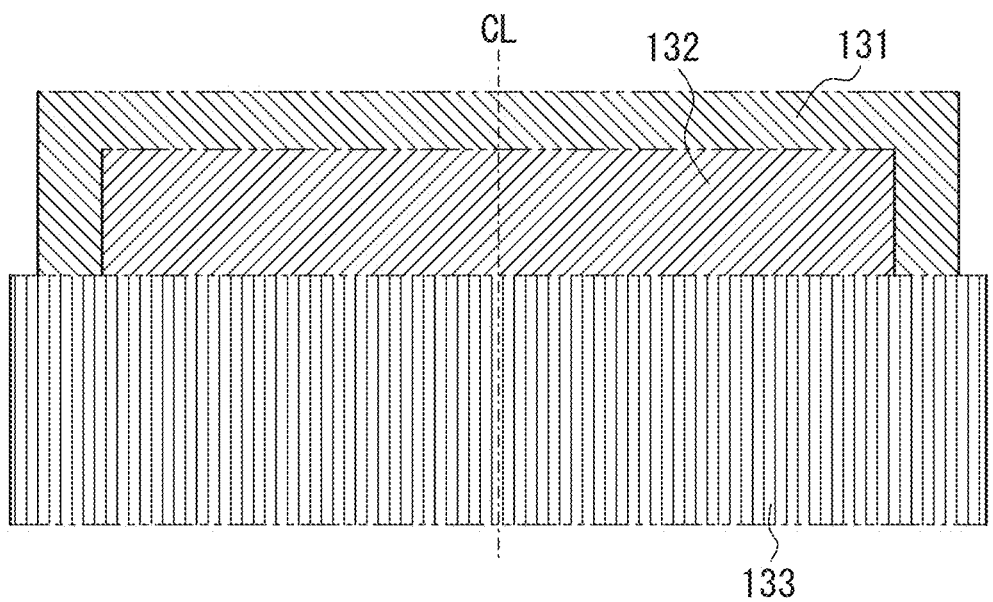
FIG. 11 is a plan view of yet another example of belt structure.

FIG. 11 schematically illustrates yet another example of the belt structure, in which a single circumferential belt layer 133 is laminated on the outer side of two inclined belt layers 131 and 132 in the tire radial direction.

In a tire of narrow-width large-diameter size, the circumferential belt layers are preferably highly rigid, and more concretely, preferably formed of a rubberized layer of cords extending in the tire circumferential direction, which preferably satisfy $1500 \geq X \geq 750$, where X is defined as $X = Y \times n \times m$, Y representing the Young's modulus (GPa) of the cords, n representing the number of the cords (cords/50 mm), and m representing the number of the circumferential belt layers. A tire of narrow-width large-diameter size often undergoes local deformation in the tire circumferential direction in response to input from the road surface upon cornering, and the contact surface is likely to have a substantially triangular shape, that is, the contact length in the circumferential direction is largely changed depending on the position in the tire width direction. In contrast, with the circumferential belt layers formed to have high rigidity, ring rigidity of the tire is improved, and deformation in the tire circumferential direction is prevented, with the result that deformation in the tire width direction is also prevented by the incompressibility of the rubber, making the change in ground contact shape unlikely. Furthermore, the improved ring rigidity promotes eccentric deformation, which improves rolling resistance at the same time. The effect of improving rolling resistance is especially enhanced extensively in a tire of narrow-width large-diameter size.

Furthermore, when the highly rigid circumferential belt layers are used as described above, the inclination angle of belt cords of the inclined belt layers with respect to the tire circumferential direction is preferably high, e.g., 35° or more. The use of the highly rigid circumferential belt layers increases rigidity in the tire circumferential direction, which may inadvertently reduce the contact length in some tires. In light of the above, belt layers inclined at a high angle may be used to reduce out-of-plane flexural rigidity in the tire circumferential direction to increase stretching of the rubber in the tire circumferential direction upon tread surface deformation, to thereby reduce reduction in contact length.

In a tire of narrow-width large-diameter tire, waved cords may also be used for the circumferential belt layers, in order to increase breaking strength. Breaking strength may similarly be increased by using high-elongation cords (for example, with the elongation at break of 4.5% to 5.5%).

Furthermore, in a tire of narrow-width large-diameter size, various materials may be adopted as the circumferential belt layers, as typically exemplified by rayon, nylon, polyethylene naphthalate (PEN), polyethylene terephthalate (PET), aramid, glass fiber, carbon fiber, steel, and the like, with organic fiber cords being especially preferred in terms of weight reduction.

Here, in a tire of narrow-width large-diameter size, the circumferential belt layers may adopt, as the cords thereof, monofilament cords, cords obtained by twisting a plurality of filaments, or hybrid cords obtained by twisting filaments of different materials.

Furthermore, in a tire of narrow-width large-diameter size, the number of cords of the circumferential belt layers may be in the range of 20 to 60 per 50 mm, without being limited to this range.

Furthermore, in a tire of narrow-width large-diameter size, distributions may be provided in the tire width direction in terms of rigidity, material, the number of layers, the density of the cords, or the like. For example, the number of the circumferential belt layers may be increased, for example, only in tire widthwise end portions. On the other hand, the number of the circumferential belt layers may be increased only in the center portion.

Furthermore, in a tire of narrow-width large-diameter size, the circumferential belt layers may be designed to be wider or narrower than the inclined belt layers. For example, the circumferential belt layers may be designed to have a width in the range of 90% to 110% of the width of the maximum-width inclined belt layers having the maximum width in the tire width direction of the inclined belt layers.

Herein, the circumferential belt layers may be configured as spiral layers, which is particularly advantageous for the sake of production.

Additionally, in a tire of narrow-width large-diameter size, the circumferential belt layers may optionally be omitted.

In a tire of narrow-width large-diameter size, the carcass line may adopt various structures. For example, the carcass maximum width position in the tire radial direction may be closer to either the bead portion side or the tread side. For example, the carcass maximum width position may be located on the tire radial outer side of the bead base portion, within the range of 50% to 90% of the tire section height.

In a tire of narrow-width large-diameter size, the carcass may also adopt various structures. For example, the number of carcasses may be in the range of 20 to 60 per 50 mm, without being limited to this range.

Furthermore, for example, the carcass may have a folded end positioned on the tire radial inner side relative to the tire radial end of a bead filler. Alternatively, the carcass folded end may be positioned on the tire radial outer side relative to the tire radial outer side end of the bead filler or the tire maximum width position, or may be extended, in some cases, to the tire widthwise inner side relative to the tire widthwise end of the inclined belt layer. Moreover, in the case where the carcass is formed of a plurality of carcass plies, the folded ends of the carcasses may be located at different positions in the tire radial direction. Alternatively, the presence of the carcass folded part may be omitted in the first place; instead, the carcass may be structured to be inserted between a plurality of bead core members or wound around the bead core.

In a tire of narrow-width large-diameter size, the tire side portion is preferably reduced in thickness. The "tire side portion is reduced in thickness" for example in such a manner that the tire widthwise sectional area S1 of the bead filler may be from at least one times and not more than four times the tire widthwise sectional area S2 of the bead core. Furthermore, when the sidewall portion has a gauge Ts at the tire maximum width portion, and the bead core has a bead width Tb at the center position in the tire radial direction, the ratio of Ts to Tb (Ts/Tb) may be 15% or more and 40% or less. Moreover, when the sidewall portion has a gauge Ts at the tire maximum portion, and the carcass has a carcass cord with a diameter Tc, the ratio of Ts to Tc (Ts/Tc) may be 5 or more and 10 or less.

Note that the gauge Ts is a total thickness of all the members, including rubber, the reinforcement member, and the inner liner. Furthermore, when the tire is structured to have the bead core divided into a plurality of small bead cores by the carcass, Tb refers to the distance between the innermost end portion and the outermost end portion in the width direction of all the small bead cores.

In a tire of narrow-width large-diameter size, the tire maximum width position may be located on the tire radial outer side of the bead base portion, within the range of 50% to 90% of the tire section height.

A tire of narrow-width large-diameter size may have a rim guard.

In a tire of narrow-width large-diameter size, the bead filler may be omitted.

In a tire of narrow-width large-diameter size, the bead core may employ various structures, including those having, in cross sections thereof, a circular shape and a polygon shape. Other examples that may be employed include a structure of winding the carcass around the bead core or a structure of inserting the carcass between a plurality of bead core members.

In a tire of narrow-width large-diameter size, the bead portion may further include, for example, a rubber layer and a cord layer for reinforcement purposes. These additional members may be disposed in various positions with respect to the carcass and the bead filler.

In a tire of narrow-width large-diameter size, the inner liner is preferably thick from the viewpoint of reducing the vehicle noise of 80 Hz to 100 Hz. For example, the thickness of the inner liner is preferably from 1.5 mm to 2.8 mm, which is greater than normal (approximately 1.0 mm).

It has been known that, in a tire of narrow-width large-width size, the vehicle noise of 80 Hz to 100 Hz tends to deteriorate especially under use of high internal pressure. By thickening the inner liner, vibration damping performance is improved, and the vehicle noise of 80 Hz to 100 Hz is reduced. As to the inner liner, since the loss contributing to rolling resistance is smaller than other members such as the tread, it is possible to minimize the deterioration of rolling resistance and also improve noise performance.

In a tire of narrow-width large-width size, the inner liner may be formed with a rubber layer mainly composed of butyl rubber or with a film layer mainly composed of resin.

In a tire of narrow-width large-diameter size, in order to reduce cavity resonance, the tire inner surface may include a porous member arranged thereon or may be treated with an electrostatic flocking process.

A tire of narrow-width large-diameter tire may optionally include, on the tire inner surface, a sealant member for preventing air leakage upon a blowout of the tire.

A tire of narrow-width large-diameter size may optionally be configured as a side reinforced run flat tire having a reinforcing rubber having a crescent section disposed on the tire side portion.

In a tire of narrow-width large-diameter size, the side portion may be simplified in structure when configured as a side reinforced run flat tire, to thereby achieve both run flat durability and fuel efficiency. This is based on the finding that, in the case of a pneumatic radial run flat tire for passenger vehicles having narrow-width large-diameter size, the tire undergoes, during run-flat traveling, relatively small deformation in the side portion and the tread portion but goes through relatively large deformation from the shoulder portion to the buttress portion. Such deformation is in contrast to that a conventional size tire undergoes relatively large deformation in the side portion.

Such deformation unique to a tire of narrow-width large-diameter size allows the tire to have a simplified structure to sufficiently ensure run flat durability and further improve fuel efficiency.

Concretely, the simplification of tire structure may be achieved when at least any one of the following conditions (i) to (iii) is satisfied.

Figure 12:
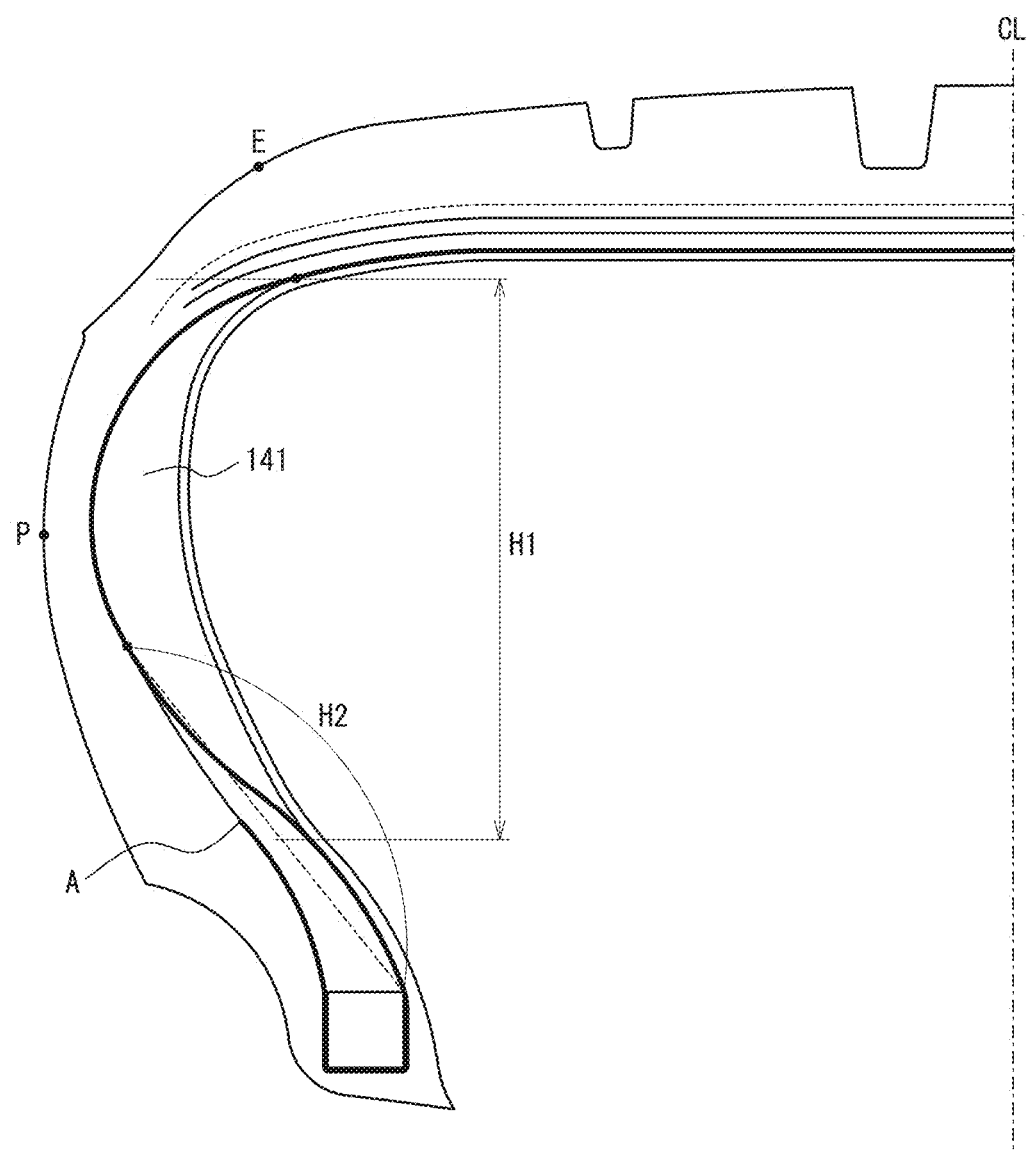
FIG. 12 is a schematic sectional view in tire width direction of a half portion of a pneumatic tire according to Embodiment 3 of the present disclosure.

FIG. 12 is a sectional view of a tire in the tire width direction according to one of embodiments of the present disclosure in the case where the tire of the present disclosure is a run flat tire of narrow-width large-diameter size.

(i) As illustrated in FIG. 12, the folded end A of the carcass folded part is positioned on the tire radial inner side than the tire maximum width position P. (ii) The tire in a reference state as being assembled to a rim and filled with a predetermined internal pressure with no load applied thereon satisfies a relation of $1.8 \leq H1/H2 \leq 3.5$, where H1 represents the tire radial maximum length of the side reinforcing rubber 141 in a tire widthwise section and H2 represents the length of a line segment connecting the tire radial outermost side point of the bead filler and the tire radial outermost side point of the bead core. (iii) The tire in a reference state as being assembled to a rim and filled with a predetermined internal pressure with no load applied thereon satisfies a relation of 10 (mm)≤(SW/OD)×H1≤20 (mm), where H1 (mm) represents the tire radial maximum length of the side reinforcing rubber 141 in a tire widthwise section.

When a tire of narrow-width large-diameter size is configured as a side reinforced run flat tire, the circumferential main groove on the tire widthwise outermost side is arranged closer to the tire equator plane CL in the tire width direction, to thereby further improve run flat durability. This is based on the finding that, in the case of a pneumatic radial run flat tire for passenger vehicles having narrow-width large-diameter size, the tire undergoes, during run-flat traveling, relatively small deformation in the side portion and the tread portion but goes through relatively large deformation from the shoulder portion to the buttress portion. Such deformation is in contrast to that a conventional size tire undergoes relatively large deformation in the side portion. Due to the deformation unique to narrow-width large-diameter size as described above, the circumferential main groove on the tire widthwise outermost side may be arranged closer to the tire equator plane CL, to thereby increase grounding property from the shoulder land portion to the buttress portion in run-flat traveling, which alleviates the contact pressure. As a result, the tire is further improved in run flat durability.

Figure 13:
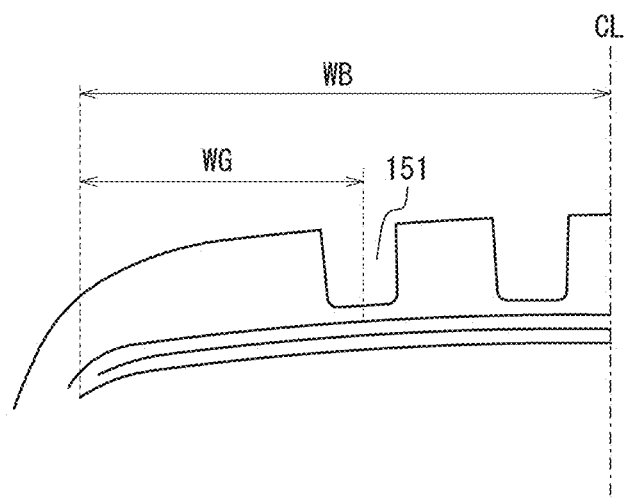
FIG. 13 is a schematic partial sectional view in tire width direction of a half portion of a pneumatic tire according to Embodiment 4 of the present disclosure.

FIG. 13 is a sectional view of a tire in the tire width direction according to another embodiment of the present disclosure in the case where the tire of the present disclosure is a run flat tire of narrow-width large-diameter size.

Concretely, the tire in a reference state as being assembled to a rim and filled with a predetermined internal pressure with no load applied thereon preferably satisfies a relation of 0.5≤WG/WB≤0.8, where WB represents the half width in the tire width direction of a belt layer maximum in width in the tire width direction of the one or more belt layers in a tire widthwise section, and WG represents a tire widthwise distance from the tire widthwise end of a belt layer maximum in width in the tire width direction to the tire widthwise center position of the circumferential main groove 151 in the tire widthwise outermost side of the one or more circumferential main grooves.

The foregoing has explained embodiments of the present disclosure with reference to the drawings. However, the pneumatic tire of the present disclosure is not particularly limited to the aforementioned examples, and appropriate changes may be made to the pneumatic tire of the present disclosure.

EXAMPLES

Hereinafter, the present disclosure will be described in more detail by Examples. However, the present disclosure is not limited to the following Examples by any means.

To confirm the presently disclosed effects, tires of Examples 1 to 2 and tires of Comparative Examples 1 to 4 were experimentally produced.

Example 1

The tire of Example 1 is a radial tire having a tire size of 165/60R19 as shown in FIG. 5 and has the structure shown in Table 1. In the tire of Example 1, three circumferential main grooves are arranged on the tread surface T. Furthermore, in two rib-like land portions defined by the three circumferential main grooves in the tire of Example 1, a plurality of one-end-open sipes and small holes as and both-end-closed sipes are arranged in the tire circumferential direction. The circumferential main grooves have a groove width of 7.5 mm and a groove depth of 7 mm, the one-open-end sipes have a width of 0.7 mm and a depth of 5 mm, and the both-end-closed sipes have a diameter of 1.5 mm and a depth of 6 mm.

Example 2

The tire of Example 2 is the same as the tire of Example 1 except for that small holes as the both-end-closed sipes that are present within every pitch length L are changed to a single line (vertical groove). The vertical groove is a sipe extending along the tire circumferential direction and has a width of 0.7 mm and a depth of 6 mm.

Comparative Example 1

The tire of Comparative Example 1 is a radial tire having a tire size of 195/65R15 and has the structure shown in Table 1. In the tire of Comparative Example 1, three circumferential main grooves are arranged on the tread surface T. In two land portions defined by the circumferential main grooves in the tire of Comparative Example 1, communication grooves, which have both ends open to the circumferential main grooves to cross the land portions, are arranged, and neither one-end-open sipes nor both-end-closed sipes are arranged. The circumferential main grooves have a groove width of 9 mm and a groove depth of 6.5 mm.

Comparative Example 2

The tire of Comparative Example 2 is the same as the tire of Example 1 except for that, in two land portions defined by the three circumferential main grooves, communication grooves, which have both ends open to the circumferential main grooves to cross the land portions, are arranged, and neither one-end-open sipes nor both-end-closed sipes are arranged. The communication grooves have a groove width of 2 mm and a groove depth of 5 mm.

Comparative Examples 3 and 4

The tires of Comparative Examples 3 and 4 are the same as the tire of Example 1 except for that, in the two land portions defined by the three circumferential main grooves, the presence of the one-end-open sipes and both-end-closed sipes is altered.

Each of the above sample tires was evaluated by the method described below.
[Wet Performance]

Each of the above sample tires was assembled to a rim under the following conditions, filled with internal pressure, assembled to a vehicle, and then driven on a wet road surface at a speed of 80 km/h. After driving in the above state, stopping distance (m) upon full braking was measured, and mean deceleration (m/s$^2$) at this time (calculated as a=v$^2$/2L from mv$^2$/2=maL, where a represents mean deceleration, v represents initial speed, m represents mass, and L represents stopping distance) was calculated. The evaluation results are indicated with indices in which the reciprocals of the values of the sample tires are used and the tire of Comparative Example 1 is 100. The larger index value indicates better wet performance.
Examples 1 and 2, and Comparative Examples 2 to 4: rim size 5.5J-19, internal pressure 300 kPa
Comparative Example 1: rim size 6.5J-15, internal pressure 220 kPa
[Rolling Resistance Performance]

Each of the above sample tires was, under the same measuring conditions for wet performance, assembled to a rim, filled with internal pressure, applied with the maximum load defined for each tire, and rolling resistance was measured under the condition of drum rotational velocity of 100 km/h.

The evaluation results are indicated with indices in which the reciprocals of the values of the sample tires are used and the tire of Comparative Example 1 is 100. The larger index value indicates better rolling resistance performance.
[Cornering Power]

Cornering power was measured using a flat-belt cornering tester. In detail, each of the above sample tires was, under the same conditions as the measuring conditions for wet performance, assembled to a rim, filled with internal pressure, attached to a flat-belt cornering tester, and then measurement was carried out. At a belt speed of 100 km/h, the cornering force was measured in a state where the slip angle (SA) between the rolling direction of the tire and the circumferential direction of the drum is 1°.

The evaluation results are indicated with indices in which the cornering force of Comparative Example 1 is 100. The larger index value indicates better cornering force at the slip angle, i.e. better cornering power at the slip angle.

23: Tread rubber
24: Tread portion
25: Sidewall portion
26: Belt
3: Circumferential main groove
4: Rib-like land portion
5: Shoulder land portion
6: One-end-open sipe
61: Widthwise sipe portion
62: Circumferential sipe portion
7: Both-end-closed sipe
81: Connecting portion
82: Coupling portion
111, 112, 121, 122, 131, 132: Inclined belt layer
113, 114, 123, 133: Circumferential belt layer
141: Side reinforcing rubber
151: Circumferential main groove
A: Widthwise center line
E: Tread ground contact edge
L: Pitch length
P1, P2, P3: Pattern
R1, R2: Radius of curvature
T: Tread surface
TW: Tread width
W: Land portion width of rib-like land portion

The invention claimed is:

1. A pneumatic tire comprising, on a tread surface, at least two circumferential main grooves extending continuously in a tire circumferential direction and at least one rib-like land portion defined by two adjacent circumferential main grooves of the at least two circumferential main grooves, wherein the rib-like land portion includes neither grooves nor sipes that extend to include a widthwise center line of the rib-like land portion, the rib-like land portion includes sets of a pair of one-end-open sipes disposed on each of one and opposite sides with respect to the widthwise center line of the rib-like land portion in point symmetry about the widthwise center line of the rib-like land portion and a plurality of both-end-closed sipes on each of the one and opposite sides with respect to the widthwise center line of the rib-like land portion, each of the one-end-open sipes having one end open to one of the circumferential main grooves and another end closed within

TABLE 1

| | Comparative Example 1 | Comparative Example 2 | Example 1 | Comparative Example 3 | Comparative Example 4 | Example 2 |
|---|---|---|---|---|---|---|
| Tire size | 195/65R15 | 165/60R19 | 165/60R19 | 165/60R19 | 165/60R19 | 165/60R19 |
| Presence of communication groove | Present | Present | Absent | Absent | Absent | Absent |
| One-end-open sipe | Absent | Absent | Present | Present | Absent | Present |
| Both-end-closed sipe | Absent | Absent | Present | Absent | Absent | Present |
| Shape of both-end-closed sipe | — | — | Small hole | Small hole | Small hole | Line (vertical groove) |
| Ground-contact width (mm) | 145 | 125 | 125 | 125 | 125 | 125 |
| Wet performance | 100 | 102 | 110 | 107 | 104 | 110 |
| Rolling resistance performance | 100 | 130 | 131 | 131 | 132 | 131 |
| Cornering power | 100 | 110 | 111 | 111 | 113 | 110 |

It is seen from Table 1 that wet performance is improved in the tires of Examples 1 and 2 compared to the tires of Comparative Examples 1 to 4.

INDUSTRIAL APPLICABILITY

The present disclosure provides a pneumatic tire that improves tire circumferential rigidity of the land portion in the tread portion and that also improves wet performance.

REFERENCE SIGNS LIST

1: Pneumatic tire
21: Bead portion
22: Carcass the rib-like land portion, and the both-end-closed sipe having both ends closed within the rib-like land portion, each of the one-end-open sipes has only one circumferential sipe portion that extends at a larger inclination angle with respect to the tire width direction than an inclination angle with respect to the tire circumferential direction and only one widthwise sipe portion that extends at a larger inclination angle with respect to the tire circumferential direction than an inclination angle with respect to the tire width direction, the inclination angle of the circumferential sipe portion with respect to the tire width direction is larger than that of the widthwise sipe portion, the circumferential sipe portion being located closer to the widthwise center line of the rib-like land portion than the both-end-closed sipe, and the widthwise sipe portion extending from the circumferential sipe portion and being open to the one of the circumferential main grooves;

wherein the sets of a pair of one-end-open sipes are arranged in the tire circumferential direction, so that one of the circumferential sipe portions on the one side of the widthwise centerline of the rib-like land portion overlaps with the circumferential sipe portions of two of the one-end-open sipes and an entirety of the widthwise sipe portion of one of the two overlapping one-end-open sipes on the opposite side of the widthwise center line of the rib-like land portion in the tire circumferential direction.

2. The pneumatic tire of claim 1, wherein each of the both-end-closed sipes comprise a small hole that has a circular shape when viewed on the tread surface.

3. The pneumatic tire of claim 2, wherein a depth of the one-end-open sipes, a depth of the both-end-closed sipes, and a depth of the circumferential main grooves have the following relation:

depth of the circumferential main grooves>depth of the both-end-closed sipes>depth of the one-end-open sipes.

4. The pneumatic tire of claim 1, wherein a depth of the one-end-open sipes, a depth of the both-end-closed sipes, and a depth of the circumferential main grooves have the following relation:

depth of the circumferential main grooves>depth of the both-end-closed sipes>depth of the one-end-open sipes.

5. The pneumatic tire of claim 1, wherein each of the circumferential sipe portions of the one-end-open sipes has a first end coupled to a first end of the widthwise sipe portion and a second end located in a portion of the rib-like land portion that is located closer to the another one end of the one-end-open sipe than to the widthwise center line of the rib-like land portion in the tire width direction.

6. The pneumatic tire of claim 1, wherein the inclination angle of each of the widthwise sipe portions with respect to the tire width direction is 30° or less.

7. The pneumatic tire of claim 1, wherein the inclination angle of each of the circumferential sipe portions with respect to the tire circumferential direction is 30° or less.

8. The pneumatic tire of claim 1, wherein
a plurality of one-end-open sipes is arranged at a pitch length L, and one pitch length L and a tire circumferential sipe component total length Ls of a one-end-open sipe and both-end-closed sipes arranged within one pitch length L have the following relation:

$L \leq Ls \leq 1.5\ L$.

9. The pneumatic tire of claim 1, wherein
a plurality of one-end-open sipes is arranged at a pitch length L, and one pitch length L and a land portion width W of the rib-like land portion have the following relation:

$0.5\ W \leq L \leq 1.5\ W$.

10. The pneumatic tire of claim 1, wherein
a plurality of one-end-open sipes is arranged at a pitch length L and one pitch length L is from 0.5% to 3.0% of a tire circumferential length on the widthwise center line of the rib-like land portion.

11. The pneumatic tire of claim 1, wherein
a land portion width W of the rib-like land portion is from 15% to 35% of tread width TW.

12. The pneumatic tire of claim 11, wherein
a land portion width W of the rib-like land portion is from 18% to 22% of tread width TW.

\* \* \* \* \*